United States Patent
Koyama

(10) Patent No.: US 9,804,462 B2
(45) Date of Patent: Oct. 31, 2017

(54) LIQUID CRYSTAL DISPLAY DEVICE COMPRISING TRANSISTOR USING OXIDE SEMICONDUCTOR

(71) Applicant: Semiconductor Energy Laboratory Co., Ltd., Atsugi-shi, Kanagawa-ken (JP)

(72) Inventor: Jun Koyama, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 33 days.

(21) Appl. No.: 14/582,248

(22) Filed: Dec. 24, 2014

(65) Prior Publication Data

US 2015/0185579 A1     Jul. 2, 2015

(30) Foreign Application Priority Data

Dec. 27, 2013  (JP) .................................. 2013-270825

(51) Int. Cl.
G02F 1/1362    (2006.01)
G09G 3/36      (2006.01)

(52) U.S. Cl.
CPC ....... *G02F 1/13624* (2013.01); *G09G 3/3659* (2013.01); *G09G 2300/0852* (2013.01)

(58) Field of Classification Search
None
See application file for complete search history.

(56) References Cited

U.S. PATENT DOCUMENTS

| | | | |
|---|---|---|---|
| 5,731,856 | A | 3/1998 | Kim et al. |
| 5,744,864 | A | 4/1998 | Cillessen et al. |
| 6,294,274 | B1 | 9/2001 | Kawazoe et al. |
| 6,563,174 | B2 | 5/2003 | Kawasaki et al. |
| 6,727,522 | B1 | 4/2004 | Kawasaki et al. |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Ohshima.H et al., "46.2: Invited Paper: High-Performance LTPS Technologies for Advanced Mobile Display Applications", SID Digest '07 ; SID International Symposium Digest of Technical Papers, May 2007, vol. 38, pp. 1482-1485.

(Continued)

*Primary Examiner* — David D Davis
(74) *Attorney, Agent, or Firm* — Fish & Richardson P.C.

(57) ABSTRACT

A liquid crystal display device with a novel structure is provided. Each pixel includes a first circuit for holding a high level (or low level) potential and a second circuit for holding a low level (or high level) potential. A semiconductor layer of a transistor included in each of the first and second circuits is an oxide semiconductor layer. The second circuit is reset when being supplied with the high level potential. Whether the high level potential held in the second circuit changes is controlled by a data voltage supplied to the first circuit. The potential held in the first circuit and the potential held in the second circuit are respectively supplied to a first transistor and a second transistor.

18 Claims, 23 Drawing Sheets

(56) References Cited

U.S. PATENT DOCUMENTS

| | | | |
|---|---|---|---|
| 6,992,652 B2 | 1/2006 | Koyama | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,180,496 B2 | 2/2007 | Koyama et al. | |
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,417,613 B2 | 8/2008 | Koyama | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,732,819 B2 | 6/2010 | Akimoto et al. | |
| 7,812,806 B2 | 10/2010 | Koyama et al. | |
| 7,889,159 B2 * | 2/2011 | Nathan | G09G 3/3233 345/77 |
| 8,044,893 B2 * | 10/2011 | Nathan | G09G 3/3233 315/169.3 |
| 8,482,504 B2 | 7/2013 | Koyama et al. | |
| 8,614,652 B2 * | 12/2013 | Nathan | G09G 3/3233 345/55 |
| 8,890,788 B2 | 11/2014 | Koyama et al. | |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0020059 A1 * | 1/2010 | Suh | G09G 3/3233 345/212 |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2012/0038604 A1 * | 2/2012 | Liu | G09G 3/3648 345/211 |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-140052 A | 5/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2005-236814 A | 9/2005 |
| WO | WO-2004/114391 | 12/2004 |

OTHER PUBLICATIONS

Harada.K et al., "28.1: Distinguished Paper: A Novel Low-Power-Consumption All-Digital System-on-Glass Display with Serial Interface", SID Digest '09 ; SID International Symposium Digest of Technical Papers, Jun. 2009, vol. 40, pp. 383-386.

Ueda.N et al., "43.1: A Novel Multi-level Memory in Pixel Technology for Ultra Low Power LTPS TFT-LCD", SID Digest '10 ; SID International Symposium Digest of Technical Papers, May 2010, vol. 41, pp. 615-618.

Yamashita.K et al., "Dynamic Self-Refreshing Memory-in-Pixel Circuit for Ultra Low Power 302ppi LTPS TFT-LCD", IDW '10 : Proceedings of the 17th International Display Workshops, 2010, pp. 257-258.

Maruyama.A et al., "50.3: Novel Write-erasable Input Display with Memory Circuits and Photo-sensors", SID Digest '11 ; SID International Symposium Digest of Technical Papers, Jun. 2011, vol. 42, pp. 733-736.

(56) References Cited

OTHER PUBLICATIONS

Chen.S et al., "P-49: Design of Digital Time-Modulation Pixel Memory Circuit on Glass Substrate for Low Power Application", SID Digest '11 ; SID International Symposium Digest of Technical Papers, Jun. 2011, vol. 42, pp. 1281-1284.
Fukunaga.Y et al., "Low Power, High Image Quality Color Reflective LCDs Realized by Memory-in-Pixel Technology and Optical Optimization Using Newly-Developed Scattering Layer", SID Digest '13 ; SID International Symposium Digest of Technical Papers, Jun. 2013, vol. 44, pp. 701-704.
Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.
Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.
Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.
Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.
Clark.S et al., "First Principles Methods Using Castep", Zeitschrift fur Kristallographie, 2005, vol. 220, pp. 567-570.
Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.
Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.
Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.
Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.
Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.
Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.
Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.
Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.
Hirao.T et al., "Novel Top-Gate Zinc Oxide Thin-Film Transistors (ZnO TFTs) for AMLCDs", J. Soc. Inf. Display (Journal of the Society for Information Display), 2007, vol. 15, No. 1, pp. 17-22.
Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.
Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.
Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.
Ikeda.T et al., "Full-Functional System Liquid Crystal Display Using CG-Silicon Technology", SID Digest '04 : SID International Symposium Digest of Technical Papers, 2004, vol. 35, pp. 860-863.
Janotti.A et al., "Native Point Defects in ZnO", Phys. Rev. B (Physical Review. B), Oct. 4, 2007, vol. 76, No. 16, pp. 165202-1-165202-22.
Janotti.A et al., "Oxygen Vacancies in ZnO", Appl. Phys. Lett. (Applied Physics Letters) , 2005, vol. 87, pp. 122102-1-122102-3.
Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.
Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.
Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.
Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.
Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.
Kikuchi.H et al., "Polymer-Stabilized Liquid Crystal Blue Phases", Nature Materials, Sep. 2, 2002, vol. 1, pp. 64-68.
Kim.S et al., "High-Performance oxide thin film transistors passivated by various gas plasmas", 214th ECS Meeting, 2008, No. 2317, ECS.
Kimizuka.N et al., "Spinel, YbFe2O4, and Yb2Fe3O7 Types of Structures for Compounds in the In2O3 and Sc2O3—A2O3—BO Systems [A; Fe, Ga, or Al; B: Mg, Mn, Fe, Ni, Cu,or Zn] at Temperatures over 1000° C.", Journal of Solid State Chemistry, 1985, vol. 60, pp. 382-384.
Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.
Kitzerow.H et al., "Observation of Blue Phases in Chiral Networks", Liquid Crystals, 1993, vol. 14, No. 3, pp. 911-916.
Kurokawa.Y et al., "UHF RFCPUS on Flexible and Glass Substrates for Secure RFID Systems", Journal of Solid-State Circuits , 2008, vol. 43, No. 1, pp. 292-299.
Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.
Lee.H et al., "Current Status of, Challenges to, and Perspective View of AM-OLED ", IDW '06 : Proceedings of the 13th International Display Workshops, Dec. 7, 2006, pp. 663-666.
Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.
Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.
Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.
Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

(56) References Cited

OTHER PUBLICATIONS

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "SUFTLA Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the $In_2O_3$—$Ga_2ZnO_4$—$ZnO$ system at 1350° C.", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

Nomura.K et al., "Carrier transport in transparent oxide semiconductor with intrinsic structural randomness probed using single-crystalline $InGaO_3(ZnO)_5$ films", Appl. Phys. Lett. (Applied Physics Letters) , Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White Tandem OLEDs", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 In. QVGA AMOLED Display Using In—Ga—Zn-Oxide TFTs With a Novel Passivation Layer", SID Digest '09 : SID International Symposium Digest of Technical Papers, May 31, 2009, pp. 284-287.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide $InGaO_3(ZnO)_m$ (m<4):a Zn4s conductor", Philosophical Magazine, 2001, vol. 81, No. 5, pp. 501-515.

Orita.M et al., "Mechanism of Electrical Conductivity of Transparent $InGaZnO_4$", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn-Oxide TFT", SID Digest '09 : SID International Symposium Digest of Technical Papers, May 31, 2009, pp. 184-187.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium-Gallium-Zinc Oxide Semiconductor Upon Exposure to Water", Appl. Phys. Lett. (Applied Physics Letters) , 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters) , Jun. 26, 2007, vol. 90, No. 26, pp. 262106-1-262106-3.

Park.S et al., "Challenge to Future Displays: Transparent AM-OLED Driven by Peald Grown ZnO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters) , Jun. 17, 1996, vol. 68, No. 25, pp. 3650-3652.

Sakata.J et al., "Development of 4.0-In. AMOLED Display With Driver Circuit Using Amorphous In—Ga—Zn-Oxide TFTs", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO ($Ga_2O_3$—$In_2O_3$—$ZnO$) TFT", SID Digest '08 : SID International Symposium Digest of Technical Papers, May 20, 2008, vol. 39, pp. 633-636.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs ", IDW '02 : Proceedings of the 9th International Display Workshops, Dec. 4, 2002, pp. 295-298.

Ueno.K et al., "Field-Effect Transistor on $SrTiO_3$ With Sputtered $Al_2O_3$ Gate Insulator", Appl. Phys. Lett. (Applied Physics Letters) , Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

\* cited by examiner

CAAC-OS nc-OS

□ proportion of non-CAAC    ▤ proportion of CAAC as-sputtered after the heat treatment at 450°C FIG. 22A  Tsig(H)
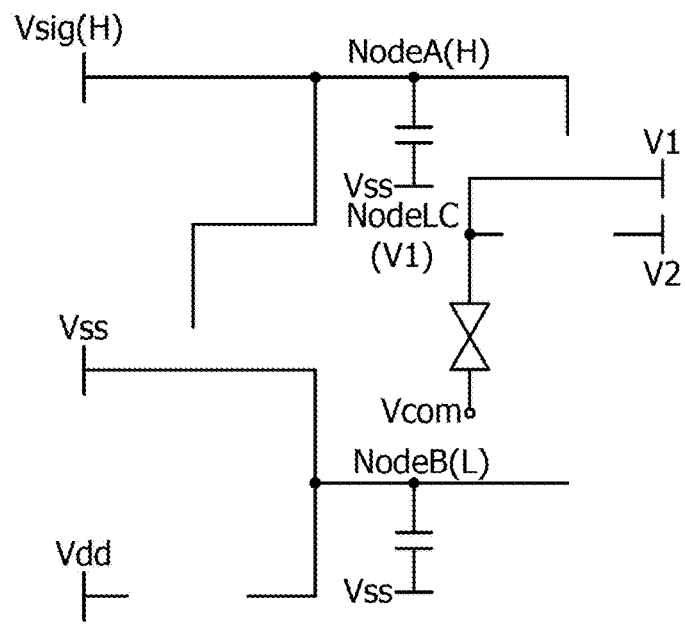
FIG. 22B  Tsig(L)
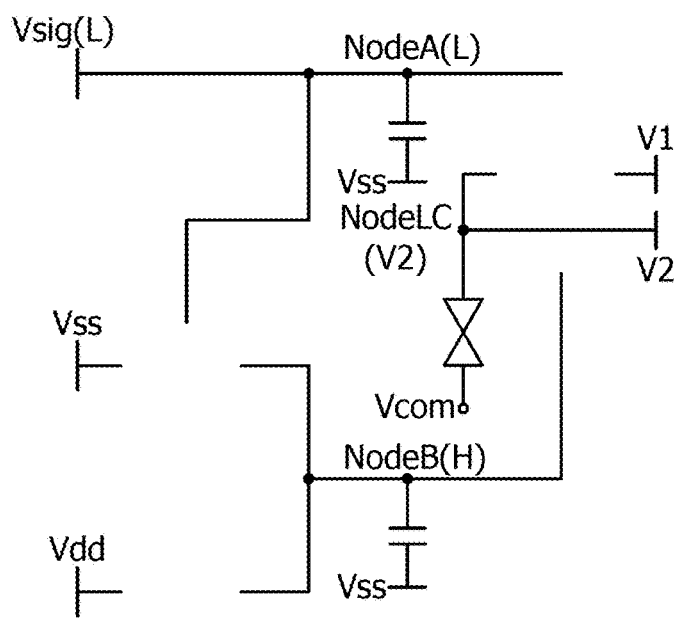

LIQUID CRYSTAL DISPLAY DEVICE COMPRISING TRANSISTOR USING OXIDE SEMICONDUCTOR

BACKGROUND OF THE INVENTION

1. Field of the Invention

One embodiment of the present invention relates to a display device, in particular, a liquid crystal display device.

Note that one embodiment of the present invention is not limited to the above technical field. The technical field of the invention disclosed in this specification and the like relates to an object, a method, or a manufacturing method. Furthermore, the present invention relates to a process, a machine, manufacture, or a composition of matter. Specifically, examples of the technical field of one embodiment of the present invention disclosed in this specification include a semiconductor device, a display device, a light-emitting device, a power storage device, a storage device, a method for driving any of them, and a method for manufacturing any of them.

2. Description of the Related Art

To reduce power consumption, a reflective liquid crystal display device provided with a memory in each pixel has been proposed (see Patent Document 1).

REFERENCE

Patent Document

[Patent Document 1] Japanese Published Patent Application No. 2005-236814

SUMMARY OF THE INVENTION

In the case where a memory equivalent to a static random access memory (SRAM) is provided in a pixel as disclosed in Patent Document 1, miniaturization of transistors constituting the SRAM is required as pixel resolution increases. This leads to a higher leakage current of the transistors, which causes difficulty in reducing power consumption.

In view of the above, an object of one embodiment of the present invention is to provide a low-power liquid crystal display device or the like having a novel structure. Another object of one embodiment of the present invention is to provide a liquid crystal display device or the like having a novel structure which allows a reduction in the off-state current flowing through a transistor in a pixel. Another object of one embodiment of the present invention is to provide a novel liquid crystal display device or the like.

Note that the objects of the present invention are not limited to the above objects. The above objects do not disturb the existence of other objects. The other objects are objects that are not described above and will be described below. The other objects will be apparent from and can be derived as appropriate from the description of the specification, the drawings, and the like by those skilled in the art. One embodiment of the present invention achieves at least one of the above objects and/or the other objects.

One embodiment of the present invention is a liquid crystal display device including a pixel provided with a first circuit capable of holding one of a first potential and a second potential of a data voltage, a second circuit capable of holding the other potential of the data voltage, a first transistor, and a second transistor. The one potential of the data voltage is supplied to a gate of the first transistor, and the other potential of the data voltage is supplied to a gate of the second transistor. One of a source and a drain of each of the first and second transistors is electrically connected to a conductive layer serving as a pixel electrode, the other of the source and the drain of the first transistor is electrically connected to a wiring supplied with a signal allowing light to pass through a liquid crystal layer, and the other of the source and the drain of the second transistor is electrically connected to a wiring supplied with a signal preventing light from passing through the liquid crystal layer. A semiconductor layer of a transistor included in each of the first and second circuits is an oxide semiconductor layer.

One embodiment of the present invention is a liquid crystal display device including a pixel provided with a first circuit capable of holding one of a first potential and a second potential of a data voltage, a second circuit capable of holding the other potential of the data voltage, a first transistor, and a second transistor. The one potential of the data voltage is supplied to a gate of the first transistor, and the other potential of the data voltage is supplied to a gate of the second transistor. One of a source and a drain of each of the first and second transistors is electrically connected to a conductive layer serving as a pixel electrode, the other of the source and the drain of the first transistor is electrically connected to a wiring supplied with a signal allowing light to pass through a liquid crystal layer, and the other of the source and the drain of the second transistor is electrically connected to a wiring supplied with a signal preventing light from passing through the liquid crystal layer. The first potential is higher than the second potential. The first circuit is controlled so that the second potential is held when a scan signal is supplied and the first or second potential is held when the data voltage is then applied to the first circuit. The second circuit is controlled so that the first potential is held when a reset signal is supplied and a potential different from that held in the first circuit is held when the data voltage is then applied to the first circuit. A semiconductor layer of a transistor included in each of the first and second circuits is an oxide semiconductor layer.

According to one embodiment of the present invention, it is possible to provide a low-power liquid crystal display device or the like having a novel structure. Alternatively, according to one embodiment of the present invention, it is possible to provide a liquid crystal display device or the like having a novel structure which allows a reduction in the off-state current flowing through a transistor in a pixel. Alternatively, according to one embodiment of the present invention, it is possible to provide a novel liquid crystal display device or the like.

Note that the effects of the present invention are not limited to the above effects. The above effects do not disturb the existence of other effects. The other effects are effects that are not described above and will be described below. The other effects will be apparent from and can be derived as appropriate from the description of the specification, the drawings, and the like by those skilled in the art. One embodiment of the present invention has at least one of the above effects and/or the other effects. Accordingly, one embodiment of the present invention does not have the above effects in some cases.

BRIEF DESCRIPTION OF THE DRAWINGS

In the accompanying drawings:

FIGS. 22A and 22B are circuit diagrams illustrating one embodiment of the present invention.

DETAILED DESCRIPTION OF THE INVENTION

Figure 1A:
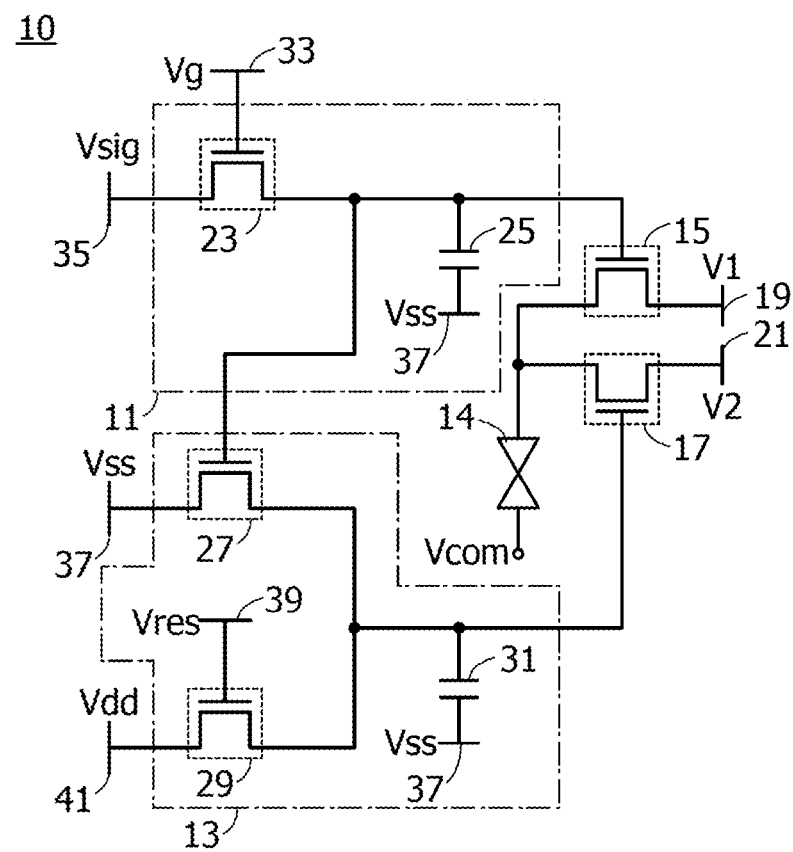
FIG. 1A is a circuit diagram illustrating one embodiment of the present invention.

Embodiments will be described below with reference to the drawings. Note that the embodiments can be implemented in various different ways and it will be readily appreciated by those skilled in the art that modes and details of the present invention can be modified in various ways without departing from the spirit and scope of the present invention. The present invention therefore should not be construed as being limited to the following description of the embodiments. Note that in structures of the invention described below, reference numerals denoting the same portions are used in common in different drawings.

In the drawings, the size, the layer thickness, or the region is exaggerated for clarity in some cases. Thus, embodiments of the present invention are not limited to such scales. Note that the drawings are schematic views showing ideal examples, and embodiments of the present invention are not limited to shapes or values shown in the drawings. For example, the following can be included: variation in signal, voltage, or current due to noise or difference in timing.

In this specification and the like, a transistor is an element having at least three terminals: a gate, a drain, and a source. The transistor includes a channel region between the drain (a drain terminal, a drain region, or a drain electrode) and the source (a source terminal, a source region, or a source electrode) and current can flow through the drain, the channel region, and the source.

Here, since the source and the drain of the transistor change depending on the structure, the operating condition, and the like of the transistor, it is difficult to define which is a source or a drain. Thus, a region that functions as a source or a region that functions as a drain is not referred to as a source or a drain in some cases. In that case, one of the source and the drain might be referred to as a first terminal, and the other of the source and the drain might be referred to as a second terminal.

In this specification, ordinal numbers such as "first," "second," and "third" are used to avoid confusion among components, and thus do not limit the number of the components.

In this specification, the expression "A and B are connected" means the case where "A and B are electrically connected" in addition to the case where "A and B are directly connected." Here, the expression "A and B are electrically connected" means the case where electric signals can be transmitted and received between A and B when an object having any electric action exists between A and B.

In this specification, terms for describing arrangement, such as "over" and "under," are used for convenience for describing the positional relationship between components with reference to drawings. Furthermore, the positional relationship between components is changed as appropriate in accordance with a direction in which each component is described. Thus, there is no limitation on terms used in this specification, and description can be made appropriately depending on the situation.

The positional relationships of circuit blocks in diagrams are specified for description, and even in the case where different circuit blocks have different functions in the diagrams, the different circuit blocks might be provided in an actual circuit or region so that different functions are achieved in the same circuit block. The functions of circuit blocks in diagrams are specified for description, and even in the case where one circuit block is illustrated, blocks might be provided in an actual circuit or region so that processing performed by one circuit block is performed by a plurality of circuit blocks.

Voltage refers to a difference between a given potential and a reference potential (e.g., a ground potential) in many cases. Thus, voltage, a potential, and a potential difference can also be referred to as a potential, voltage, and a voltage difference, respectively. Note that voltage refers to a difference between potentials of two points, and a potential refers to electrostatic energy (electric potential energy) of a unit charge at a given point in an electrostatic field.

Note that in general, a potential and voltage are relative values. Thus, a ground potential is not always 0 V.

In this specification and the like, the term "parallel" indicates that an angle formed between two straight lines is −10° to 10°, and accordingly includes the case where the angle is −5° to 5°. In addition, the term "perpendicular" indicates that an angle formed between two straight lines is 80° to 100°, and accordingly includes the case where the angle is 85° to 95°.

In this specification and the like, trigonal and rhombohedral crystal systems are included in a hexagonal crystal system.

Embodiment 1

In this embodiment, a liquid crystal display device that is one embodiment of the present invention will be described with reference to drawings.

Note that the liquid crystal display device might also be referred to as a display module including a display controller, a power supply circuit, a backlight unit, and the like provided over a separate substrate.

Figure 1B:
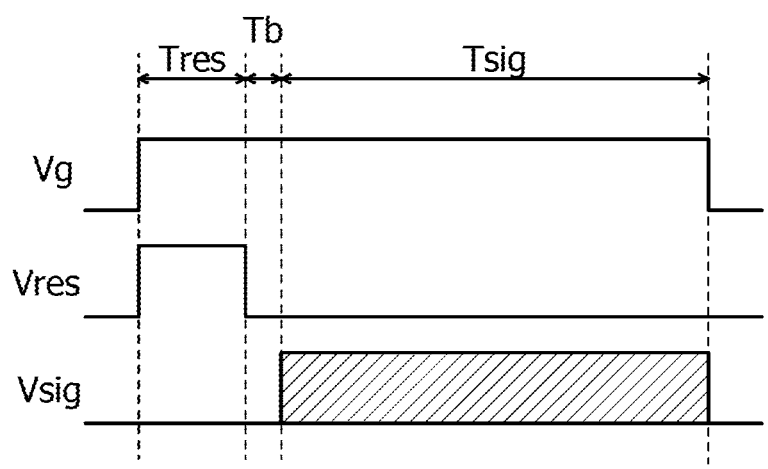
FIG. 1B is a timing chart thereof.
Figure 2A:
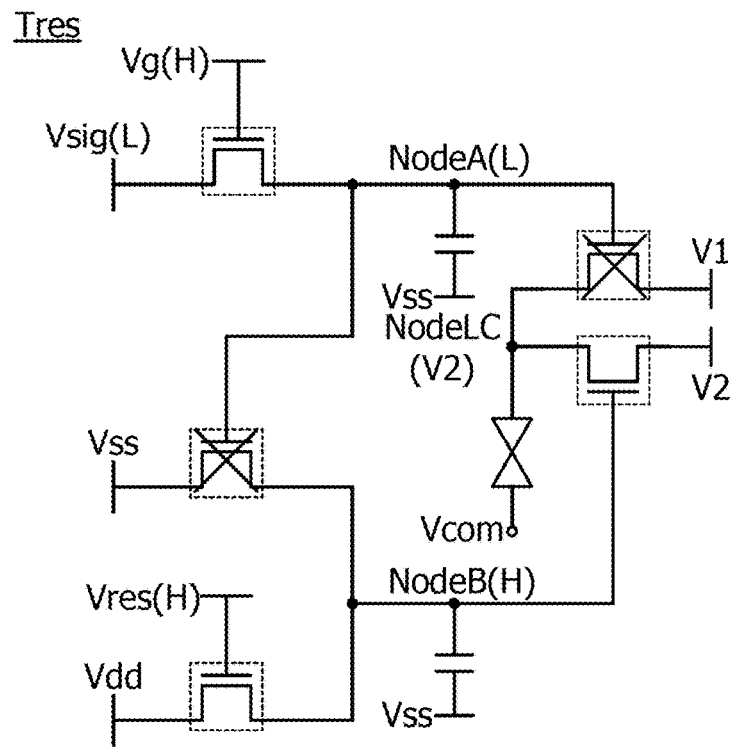
FIGS. 2A and 2B are circuit diagrams illustrating one embodiment of the present invention.
Figure 2B:
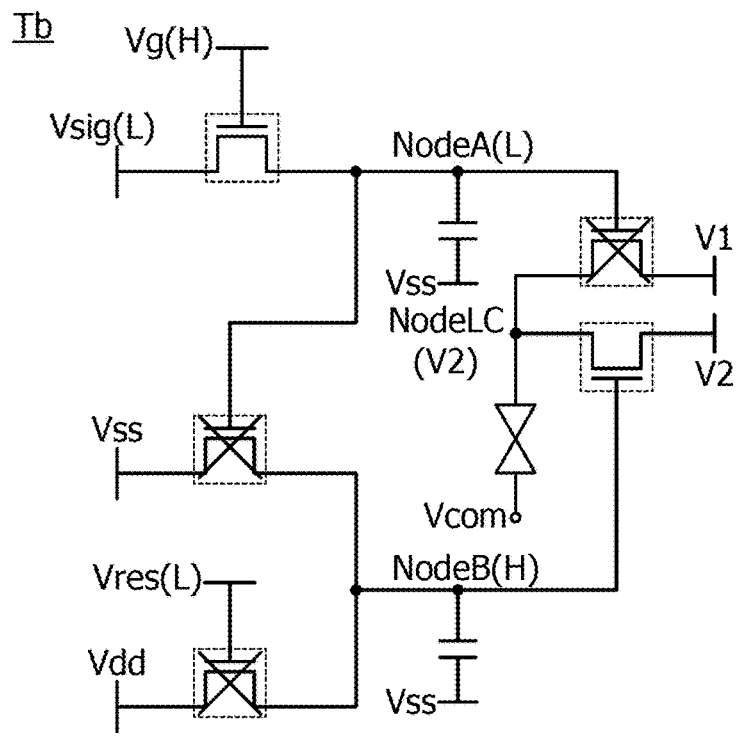
Figure 3A:
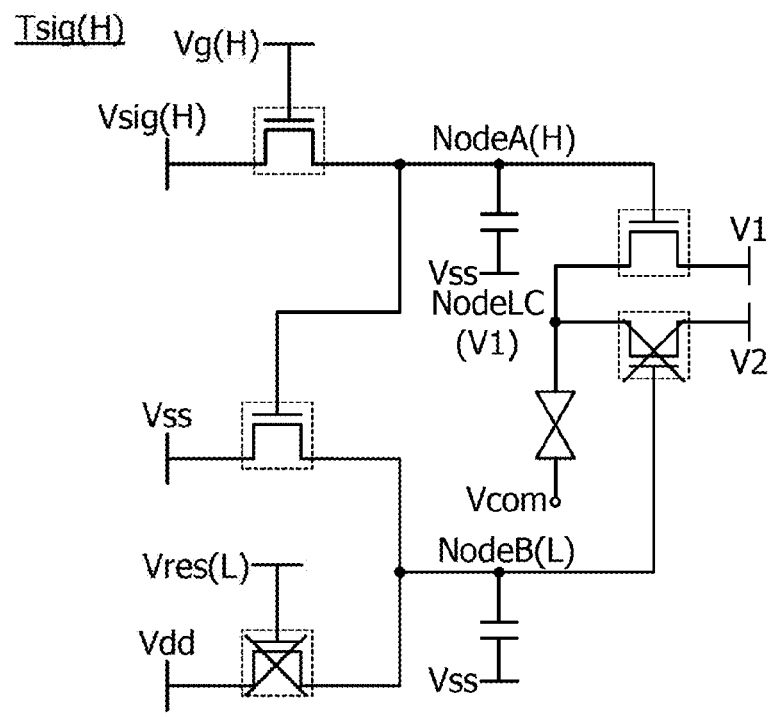
FIGS. 3A and 3B are circuit diagrams illustrating one embodiment of the present invention.
Figure 3B:
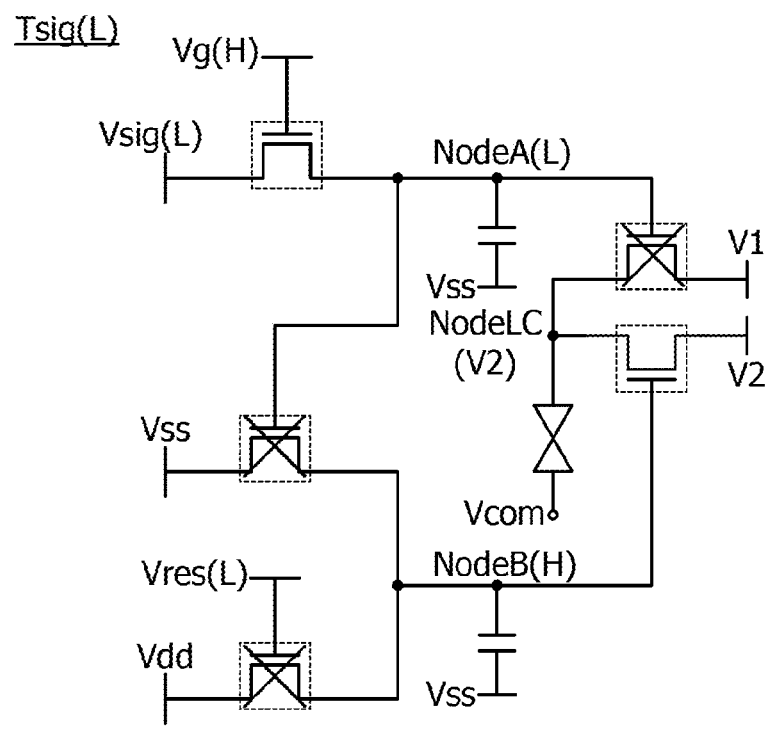

FIG. 1A is a circuit diagram of a pixel 10 included in the liquid crystal display device. FIG. 1B is a timing chart showing the operation of the pixel 10.

The pixel 10 illustrated in FIG. 1A includes a first circuit 11, a second circuit 13, a transistor 15, a transistor 17, and a liquid crystal element 14.

The first circuit 11 includes a transistor 23 and a capacitor 25.

The second circuit 13 includes a transistor 27, a transistor 29, and a capacitor 31.

The transistor 15 is turned on or off when a potential held in the first circuit 11 is supplied to its gate. The transistor 17 is turned on or off when a potential held in the second circuit 13 is supplied to its gate. Note that the transistor 15 and the transistor 17 are also referred to as a first transistor and a second transistor, respectively, in some cases.

One of a source and a drain of the transistor 15, and one of a source and a drain of the transistor 17 are connected to one electrode of the liquid crystal element 14. Note that the one electrode of the liquid crystal element 14 is a conductive layer serving as a pixel electrode. The other electrode of the liquid crystal element 14 has a function as a common electrode to which a common voltage (Vcom) is applied.

The other of the source and the drain of the transistor 15 is electrically connected to a wiring 19 supplied with a signal that allows light to pass through a liquid crystal layer. Note that when the transistor 15 is on, a voltage V1 applied to the wiring 19 controls the alignment of the liquid crystal layer between the electrodes of the liquid crystal element 14 so that light is transmitted. The electric field generated between the common voltage Vcom and the voltage V1 may be either a positive electric field or a negative electric field. For example, a signal varying around the common voltage may be supplied as the voltage V1 so that the positive electric field and the negative electric field are alternately applied.

The other of the source and the drain of the transistor 17 is electrically connected to a wiring 21 supplied with a signal that prevents light from passing through the liquid crystal layer. Note that when the transistor 17 is on, a voltage V2 applied to the wiring 21 controls the alignment of the liquid crystal layer between the electrodes of the liquid crystal element 14 so that light is not transmitted. The common voltage Vcom is equal to the voltage V2. When the common voltage Vcom is a constant voltage, a signal supplied to the wiring 21 also has a constant voltage. When the common voltage Vcom is a varying signal, the signal supplied to the wiring 21 varies similarly.

The one of the pair of electrodes of the liquid crystal element 14 has a potential based on a data signal. The other of the pair of electrodes of the liquid crystal element 14 has a common potential (Vcom).

The liquid crystal element 14 is an element that has a function of controlling transmission or non-transmission of light utilizing an optical modulation action of liquid crystal.

Note that the optical modulation action of the liquid crystal is controlled by an electric field applied to the liquid crystal (including a horizontal electric field, a vertical electric field, and a diagonal electric field). Examples of the liquid crystal element 14 are a nematic liquid crystal, a cholesteric liquid crystal, a smectic liquid crystal, a thermotropic liquid crystal, a lyotropic liquid crystal, a ferroelectric liquid crystal, and an anti-ferroelectric liquid crystal.

The display device including the liquid crystal element 14 can be driven by any of the following modes: a TN mode, a VA mode, an ASM (axially symmetric aligned micro-cell) mode, an OCB (optically compensated birefringence) mode, an MVA mode, a PVA (patterned vertical alignment) mode, an IPS mode, an FFS mode, a TBA (transverse bend alignment) mode, and the like. Note that one embodiment of the present invention is not limited to the above, and various liquid crystal elements and driving methods can be used.

The liquid crystal element may be formed using a liquid crystal composition including liquid crystal exhibiting a blue phase and a chiral material. The liquid crystal exhibiting a blue phase has a short response time of 1 msec or less and is optically isotropic; therefore, alignment treatment is not necessary and viewing angle dependence is small.

Note that in one embodiment of the present invention, the electrode serving as the pixel electrode of the liquid crystal element 14 preferably has a function of reflecting external light. In other words, the liquid crystal display device is preferably a reflective liquid crystal display device. The use of external light for making displayed images visible reduces the power consumed by a backlight, resulting in lower power consumption. Note that the electrode serving as the pixel electrode of the liquid crystal element 14 may be a light-transmitting electrode, or a combination of a light-transmitting electrode and an electrode reflecting external light.

The first circuit 11 is controlled so that a second potential is held when a scan signal is supplied and either a first potential or the second potential is held when a data voltage Vsig based on the data signal is then applied to the first circuit 11.

The second circuit 13 is controlled so that the first potential is held when a reset signal is supplied and a potential that is different from the potential held in the first circuit 11 is held when the data voltage Vsig is then applied to the first circuit 11.

Note that the first potential is based on a high power supply potential Vdd, whereas the second potential is based on a low power supply potential Vss. In other words, the data signal is a two-level signal and the data voltage Vsig is a two-level voltage. Note that the first potential is higher than the second potential.

Note that the first potential is preferably higher than a potential supplied as the signal that allows light to pass through the liquid crystal layer. The second potential is preferably lower than the potential supplied as the signal that allows light to pass through the liquid crystal layer. With such a structure, the transistors 15 and 17 can be turned on or off more surely.

The transistor 23 controls writing of a data voltage to the first circuit 11 and holding of the data voltage therein. A gate of the transistor 23 is connected to a wiring 33 to which a voltage Vg based on a scan signal is applied. One of a source and a drain of the transistor 23 is connected to a wiring 35 to which the data voltage Vsig based on a data signal is applied. The other of the source and the drain of the transistor 23 is connected to the gate of the transistor 15, one electrode of the capacitor 25, and a gate of the transistor 27. The transistor 23 is also referred to as a third transistor.

Note that in the following description, a node at which the other of the source and the drain of the transistor 23, the gate of the transistor 15, the one electrode of the capacitor 25, and the gate of the transistor 27 are connected one another is referred to as a node A (NodeA). Note that the node A allows one of the first and second potentials written by the application of the data voltage Vsig to be held in the first circuit 11.

Figure 18:
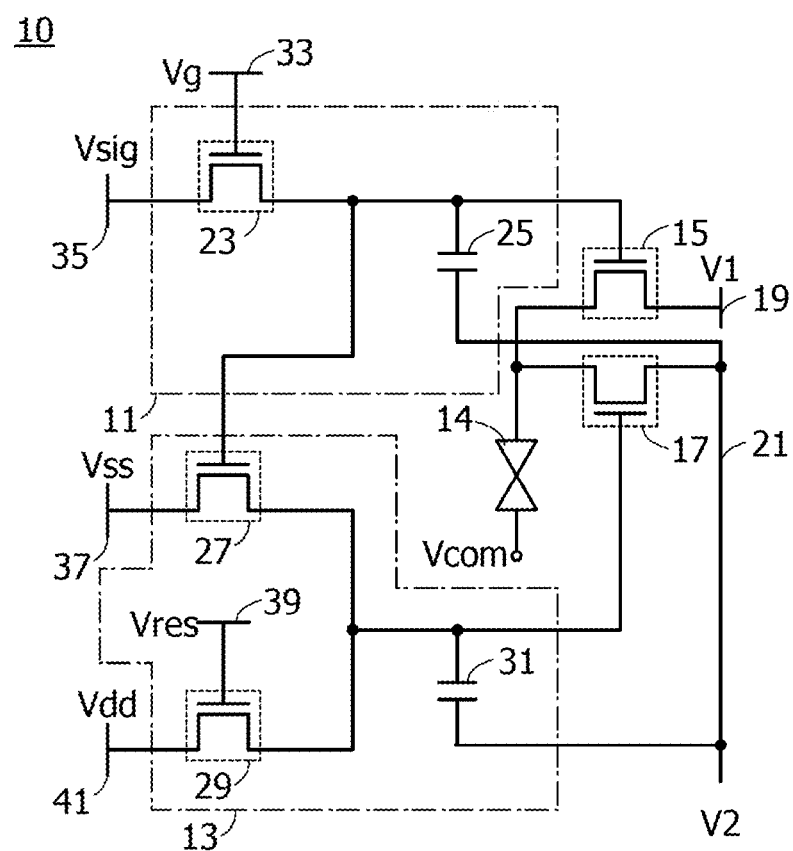
FIG. 18 is a circuit diagram illustrating one embodiment of the present invention.
Figure 20:
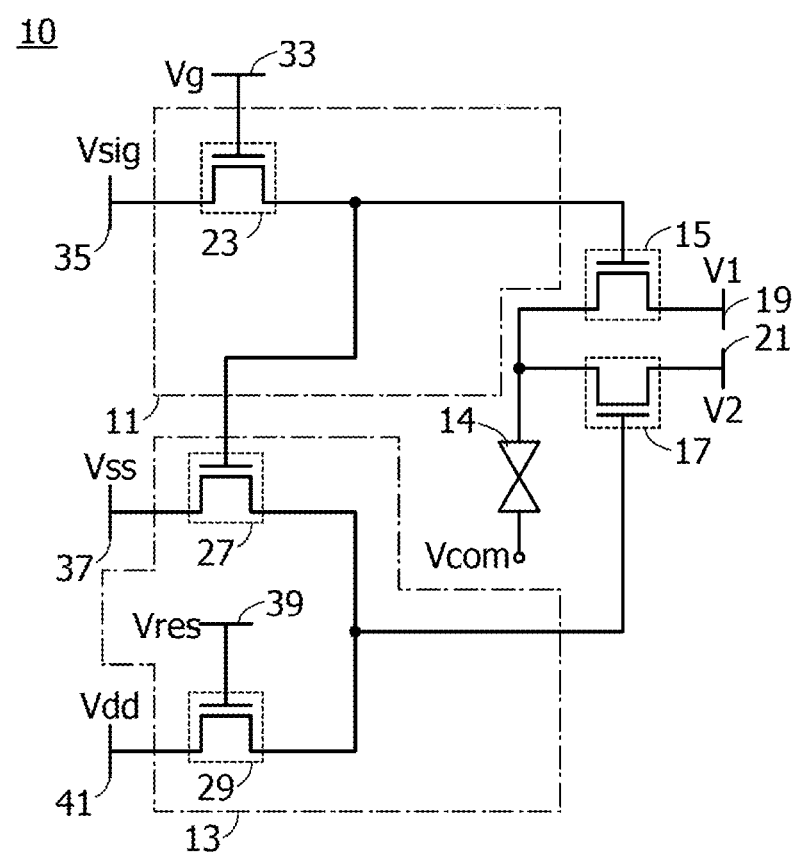
FIG. 20 is a circuit diagram illustrating one embodiment of the present invention.

The capacitor 25 allows one of the first and second potentials written by the application of the data voltage Vsig to be held in the first circuit 11. The capacitor 25 can be omitted in the case where the transistor 15 or 27 has a large gate capacitance or the node A has a large parasitic capacitance; an example of that case is illustrated in FIG. 20. Note that the capacitor 25 is also referred to as a first capacitor. Although the other electrode of the capacitor 25 is connected to a wiring 37 supplied with the second potential in FIG. 1A, the other electrode of the capacitor 25 may be connected to any wiring supplied with a fixed potential, e.g., a wiring 41 supplied with the first potential, or the wiring 21 as illustrated in FIG. 18.

By the control of the transistor 27, the first or second potential that is different from the potential held in the first circuit 11 is held in the second circuit 13. The gate of the transistor 27 is connected to the other of the source and the drain of the transistor 23, the gate of the transistor 15, and the one electrode of the capacitor 25, i.e., the node A. One of a source and a drain of the transistor 27 is connected to the wiring 37 supplied with the second potential. The other of the source and the drain of the transistor 27 is connected to the gate of the transistor 17, one electrode of the capacitor 31, and the other of a source and a drain of the transistor 29. The transistor 27 is also referred to as a fifth transistor.

Note that in the following description, a node at which the other of the source and the drain of the transistor 27, the gate of the transistor 17, the one electrode of the capacitor 31, and the other of the source and the drain of the transistor 29 are connected one another is referred to as a node B (NodeB). Note that the node B allows the other of the first and second potentials written by the application of the data voltage Vsig to be held in the second circuit 13.

Figure 19:
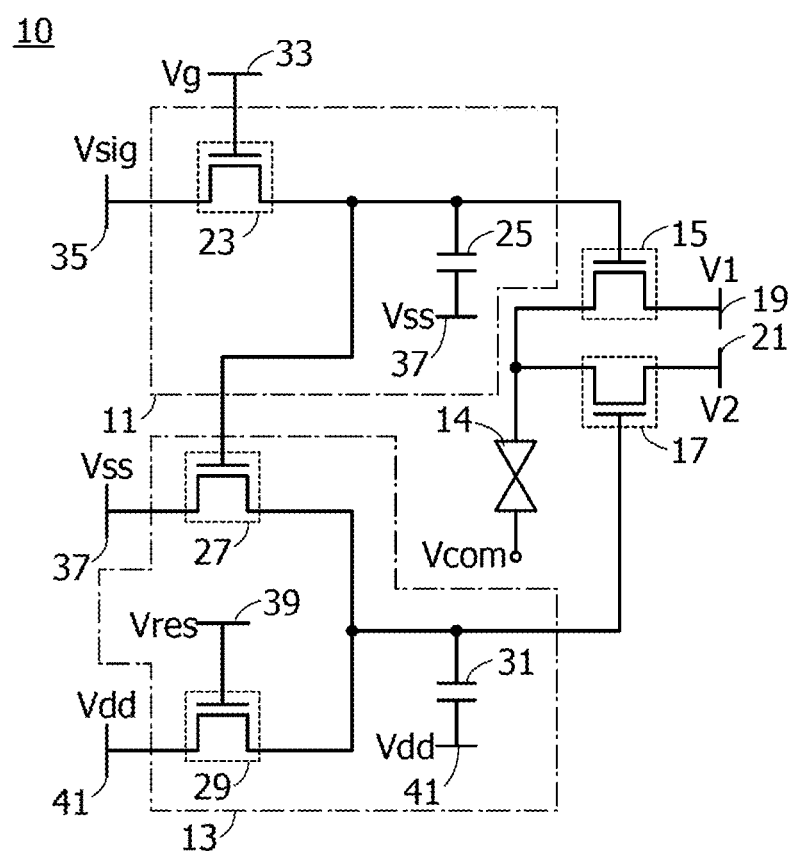
FIG. 19 is a circuit diagram illustrating one embodiment of the present invention.

The capacitor 31 allows the other of the first and second potentials written by the application of the data voltage Vsig to be held in the second circuit 13. The capacitor 31 can be omitted in the case where the transistor 17 has a large gate capacitance or the node B has a large parasitic capacitance; an example of that case is illustrated in FIG. 20. Note that the capacitor 31 is also referred to as a second capacitor. Although the other electrode of the capacitor 31 is connected to the wiring 37 supplied with the second potential, the other electrode of the capacitor 31 may be connected to a wiring supplied with a fixed potential, e.g., the wiring 41 supplied with the first potential. Note that different potentials may be supplied to the other electrode of the capacitor 31 and the other electrode of the capacitor 25; an example of that case is illustrated in FIG. 19.

By the control of the transistor 29, the node B is reset (initialized) to the first potential in advance so that the first or second potential that is different from the potential held in the first circuit 11 is held in the second circuit 13. A gate of the transistor 29 is connected to a wiring 39 supplied with a voltage Vres based on a reset signal of the transistor 29. One of the source and the drain of the transistor 29 is connected to the wiring 41 supplied with the first potential. The other of the source and the drain of the transistor 29 is connected to the gate of the transistor 17, the one electrode of the capacitor 31, and the other of the source and the drain of the transistor 27. The transistor 29 is also referred to as a fourth transistor.

In order that charge keeps being held at the node A and the node B, each of the transistors 15, 17, 23, 27, and 29 in the pixel 10 is preferably a transistor with a low off-state current (a low current flowing between a source and a drain in a non-conductive state). Accordingly, a semiconductor layer that includes a channel formation region in each of the transistors 15, 17, 23, 27, and 29 is preferably, for example, a semiconductor layer including an oxide semiconductor. Note that one embodiment of the present invention is not limited to this example. The semiconductor layer may include amorphous silicon, polycrystalline silicon, single crystal silicon, or the like.

Note that the term "low off-state current" means that a normalized off-state current per micrometer of a channel width at room temperature with a source-drain voltage of 10 V is less than or equal to 10 zA. The oxide semiconductor will be described later in detail.

Figure 23:
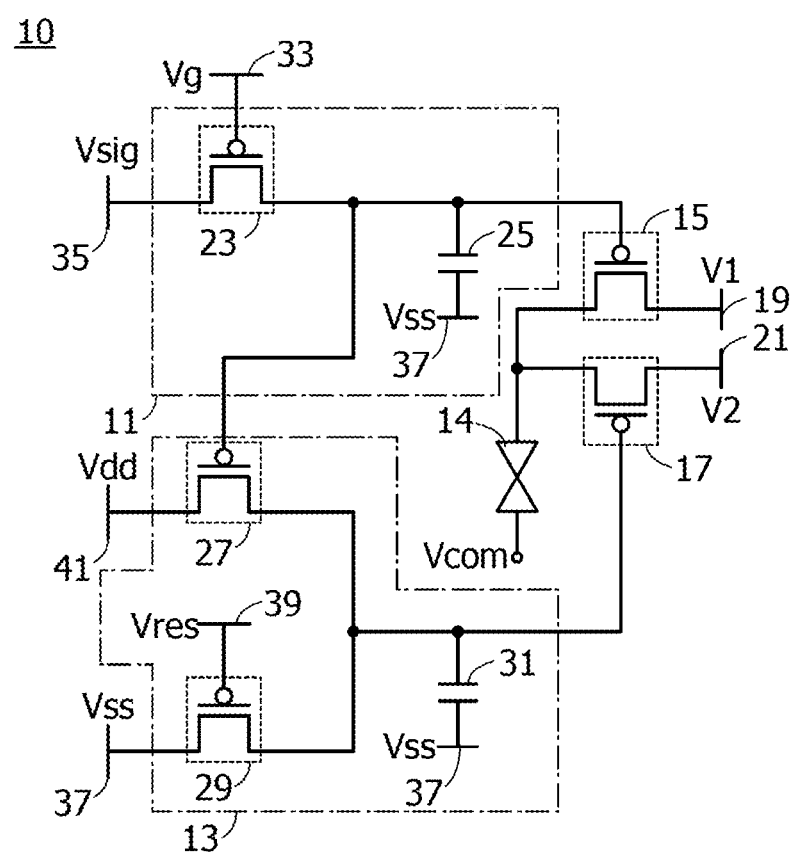
FIG. 23 is a circuit diagram illustrating one embodiment of the present invention.

Note that FIG. 1A shows an example in which only N-channel transistors are used; however, one embodiment of the present invention is not limited to this example. FIG. 23 shows an example in which only P-channel transistors are used.

With the aforementioned pixel structure in the liquid crystal display device that is one embodiment of the present invention, a potential corresponding to data can be held in the pixel while charge is consumed as little as possible unlike in an SRAM. Furthermore, with the pixel structure of the liquid crystal display device that is one embodiment of the present invention, a liquid crystal element is not directly connected to a node where charge is held. This reduces the leakage of charge through the liquid crystal element, preventing data loss and reducing power consumption.

Also with the pixel structure in the liquid crystal display device that is one embodiment of the present invention, a written data voltage can be held during the period almost equal to that in an SRAM. Hence, the operation of a driver circuit can be stopped when a still image is displayed, whereby the power consumption can be reduced.

Also with the pixel structure in the liquid crystal display device that is one embodiment of the present invention, the power consumed by a backlight can be reduced because a reflective liquid crystal display device is used. In the reflective liquid crystal display device, transistors in a pixel can be provided to overlap with a pixel electrode. Therefore, even when the number of transistors in the pixel increases, the pixel size is not reduced and display quality can be maintained.

Next, the operation of the pixel illustrated in FIG. 1A will be described with reference to a timing chart in FIG. 1B. The timing chart in FIG. 1B shows the operation in a reset period (initialization period), a blank period, and a data voltage writing period. In addition, possible conductive states of the transistors in each period are illustrated in FIGS. 2A and 2B and FIGS. 3A and 3B, and described with the timing chart. Note that each signal is a two-level signal; thus, in the drawings, a high level signal and a low level signal are abbreviated to as H and L, respectively. In the following description, it is assumed that the first potential and the second potential of the data voltage Vsig are at the high level and the low level, respectively.

FIGS. 2A and 2B and FIGS. 3A and 3B also illustrate changes in the potential at the aforementioned node A (NodeA) and node B (NodeB), and also illustrate a change in the potential of the one electrode of the liquid crystal element 14 (NodeLC). Furthermore, in FIGS. 2A and 2B and FIGS. 3A and 3B, the transistors 15, 17, 23, 27, and 29 are marked by X when being off.

First, in the reset period (Tres in FIG. 1B and FIG. 2A), the voltage Vg based on a scan signal is at the high level (denoted by H in the drawings), the voltage Vres based on a reset signal is at the high level, and the data voltage based on a data signal is at the low level (denoted by L in the drawings). Thus, the transistors 23 and 29 are turned on, so that the node A and the node B are at the low level and the high level, respectively. Moreover, the node NodeLC has the voltage V2 because the transistor 17 is turned on.

The blank period is not necessarily provided if the operation is performed smoothly.

In the blank period (Tb in FIG. 1B and FIG. 2B), the voltage Vg based on a scan signal is at the high level, the voltage Vres based on a reset signal is at the low level, and the data voltage based on a data signal is at the low level. Thus, the transistor 23 is on, so that the node A is kept at the low level and the node B is kept at the high level. Moreover, the node NodeLC has the voltage V2 because the transistor 17 is kept on.

Then, the data voltage writing period is described. First, description is made on the case where the data voltage Vsig based on a data signal is at the high level. In the data voltage writing period at the time when the data voltage Vsig is at the high level (Tsig(H) in FIG. 1B and FIG. 3A), the voltage Vg based on a scan signal is at the high level, the voltage Vres based on a reset signal is at the low level, and the data voltage based on a data signal is at the high level. Thus, the transistors 23 and 27 are turned on, so that the node A and the node B are at the high level and the low level, respectively. Moreover, the node NodeLC has the voltage V1 because the transistor 15 is turned on.

Next, description is made on the data voltage writing period at the time when the data voltage Vsig based on a data signal is at the low level. In the data voltage writing period at the time when the data voltage Vsig is at the low level (Tsig(L) in FIG. 1B and FIG. 3B), the voltage Vg based on a scan signal is at the high level, the voltage Vres based on a reset signal is at the low level, and the data voltage based on a data signal is at the low level. Thus, the transistor 23 is on, so that the node A is at the low level and the node B is at the high level. Moreover, the node NodeLC has the voltage V2 because the transistor 17 is turned on.

Note that the data voltage that has been written in the data voltage writing period can be maintained until another reset signal or scan signal is supplied. To achieve this, for example, in the case where the node A is kept at the high level, the voltage based on a scan signal is set at the low level so that the transistor 23 is turned off. In that case, the transistor 27 is on and the node B can be kept at the low level, which is opposite to the level of the node A.

In the case where the node A is kept at the low level, the voltage based a scan signal is set at the low level so that the transistor 23 is turned off. In that case, the transistors 27 and 29 are also off and the node B can be kept at the high level, which is opposite to the level of the node A.

In a period during which the data voltage written in the data voltage writing period is held, charge held in the node A and the node B hardly moves when the transistors 23, 27, and 29 each have a low off-state current. Accordingly, when the conductive states of the transistors 15 and 17 are kept, an image continues to be displayed even when a data signal is not written. In that case, a driver circuit for supplying a data signal to a pixel, a driver circuit for supplying a scan signal to the pixel, and a driver circuit for supplying a reset signal to the pixel can be stopped operating, reducing power consumption.

In the aforementioned operation of the pixel in the liquid crystal display device that is one embodiment of the present invention, a potential corresponding to data can be held in the pixel as data with different values of two nodes. Also in the operation of the pixel of one embodiment of the present invention, data can be stored in a manner similar to that in an SRAM. In addition, an increase in power consumption with miniaturization, which is caused in an SRAM, can be prevented, and charge therefore can be consumed as little as possible.

Figure 21:
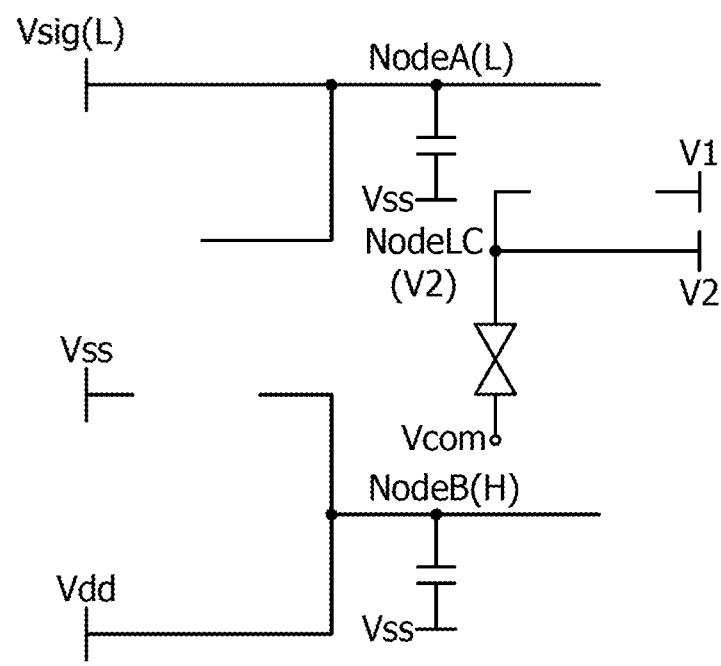
FIG. 21 is a circuit diagram illustrating one embodiment of the present invention.

Note that one embodiment of the present invention is not limited to the circuit structure illustrated in FIG. 1A. Circuit structures other than the structure in FIG. 1A may be employed when, for example, the connection structure is as shown in FIG. 21 in the reset period and is as shown in FIG. 22A or FIG. 22B in the data voltage writing period.

Also in the operation of the pixel in the liquid crystal display device that is one embodiment of the present invention, a written data voltage can be held in the first circuit and the second circuit equivalent to an SRAM. Hence, the operation of a driver circuit can be stopped when a still image is displayed, whereby the power consumption can be reduced.

Figure 4A:
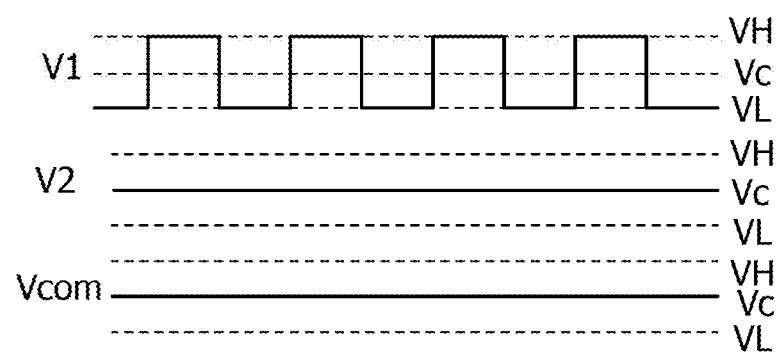
FIGS. 4A and 4B are schematic views of waveforms illustrating one embodiment of the present invention.
Figure 4B:
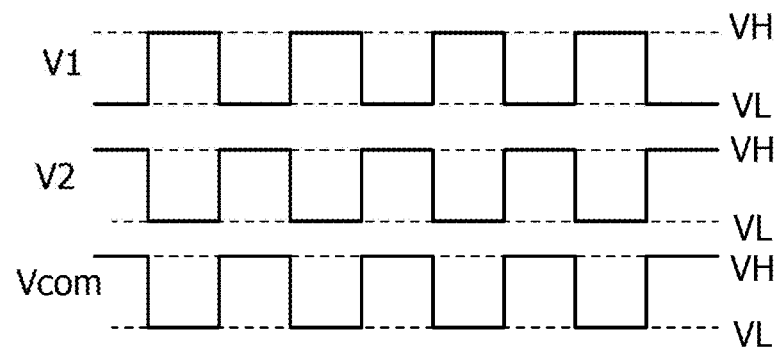

FIGS. 4A and 4B are schematic views of signal waveforms showing examples of the voltage V1 based on a signal allowing light to pass through a liquid crystal layer and the voltage V2 based on a signal preventing light from passing through the liquid crystal layer.

As shown in FIG. 4A, the voltage V1 based on the signal allowing light to pass through the liquid crystal layer may be generated so as to vary between a potential VH and a potential VL with a potential Vc therebetween every frame. Such a structure reduces degradation of liquid crystals contained in the liquid crystal layer. The common voltage Vcom and the voltage V2 based on the signal preventing light from passing through the liquid crystal layer may be generated so as to be equal to each other, here, they have the potential Vc.

The highest potential VH of the voltage V1 is preferably lower than the first potential supplied to the node A and the node B, namely, the potential Vdd. Furthermore, in one embodiment of the present invention, the lowest potential VL of the voltage V1 is preferably higher than the potential Vss, which is the second potential supplied to the node A and the node B. With such a structure, the transistors 15 and 17 can be turned on or off more surely.

Note that the voltage V1, the voltage V2, and the common voltage Vcom may each vary as shown in FIG. 4B. In that case, the signal amplitude can be lower than that in the case of FIG. 4A even when the same voltage is applied to liquid crystals, reducing power consumption.

Figure 5:
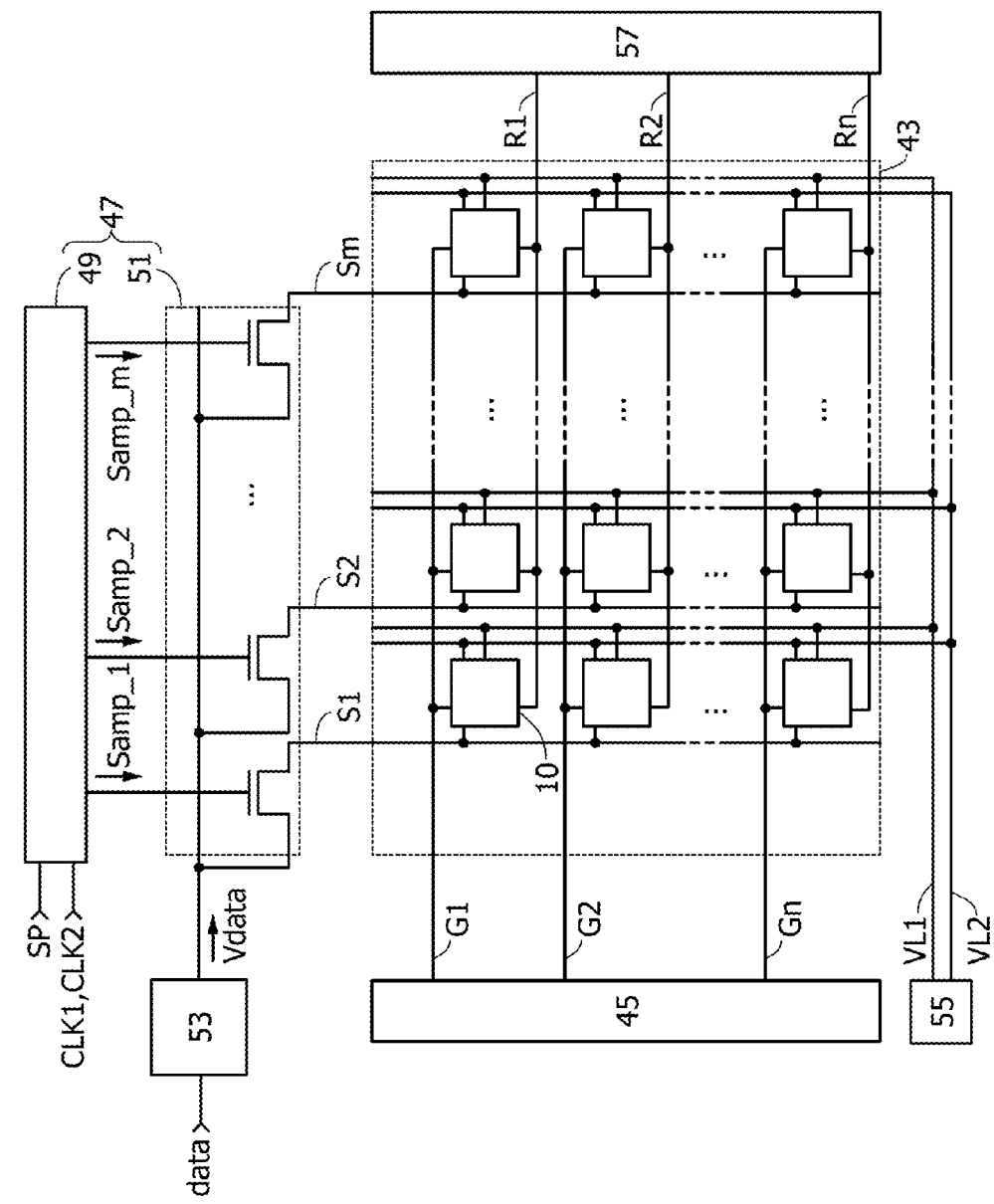
FIG. 5 is a block diagram illustrating one embodiment of the present invention.

FIG. 5 is a block diagram of a liquid crystal display device including the aforementioned pixel 10.

The display device illustrated in FIG. 5 includes a pixel portion 43, a scan line driver circuit 45, a reset signal line driver circuit 57, a signal line driver circuit 47 provided with a sampling circuit 51 and a shift register 49, n (n is a natural number) scan lines G1 to Gn which are parallel or substantially parallel to each other and whose potentials are controlled by the scan line driver circuit 45, n reset signal lines R1 to Rn which are parallel or substantially parallel to each other and whose potentials are controlled by the reset signal line driver circuit 57, and m (m is a natural number) signal lines S1 to Sm which are parallel or substantially parallel to each other and whose potentials are controlled by the signal line driver circuit 47. The pixel portion 43 includes a plurality of pixels 10 arranged in a matrix. The pixels are connected to a wiring VL1 and a wiring VL2 which supply a voltage V1 and V2, respectively, output from a voltage generator circuit 55.

The sampling circuit 51 is supplied with sampling signals Samp_1 to Samp_m output from the shift register 49, and a data signal Vdata output from a digital data generator circuit 53. A data voltage Vsig based on the data signal Vdata is sampled in the signal lines S1 to Sm and written to each pixel when the scan signal is selected. Note that the data signal Vdata is a two-level voltage signal obtained when image data (data) is converted in the digital data generator circuit 53.

Although the data signal Vdata is a two-level voltage signal in the following description, a three or more level image can also be displayed by combining another grayscale method. For example, an area grayscale method may be used in combination to display a multi-level image. In that case, each of the pixels 10 serves as a subpixel.

Figure 6A:
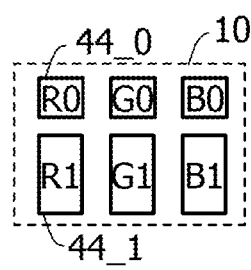
FIGS. 6A to 6C are block diagrams each illustrating one embodiment of the present invention.
Figure 6B:
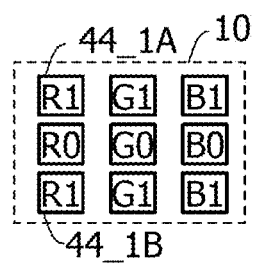
Figure 6C:
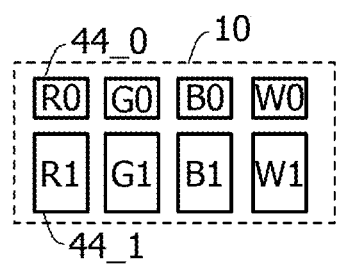

In the case where a multi-level image is displayed by the area grayscale method, subpixels are disposed, for example, as shown in FIGS. 6A to 6C. In the case where, for example, pixels performing color display are used in combination with the area grayscale method, subpixels 44_0 and 44_1 with different areas are provided for each color, red, green, and blue (RGB). Although the subpixels with different areas are used in FIG. 6A, all the subpixels may have the same area as illustrated in FIG. 6B and grayscale display may be performed by weighting the area where light passes. Instead of the structures illustrated in FIGS. 6A and 6B, which include the RGB subpixels, a structure including white (W) subpixels in addition to RGB subpixels can be employed to perform grayscale display as shown in FIG. 6C.

In the above description, the liquid crystal element is described as an example of the display element; a different display element can also be used in the pixel of the display device in one embodiment of the present invention.

Figure 7:
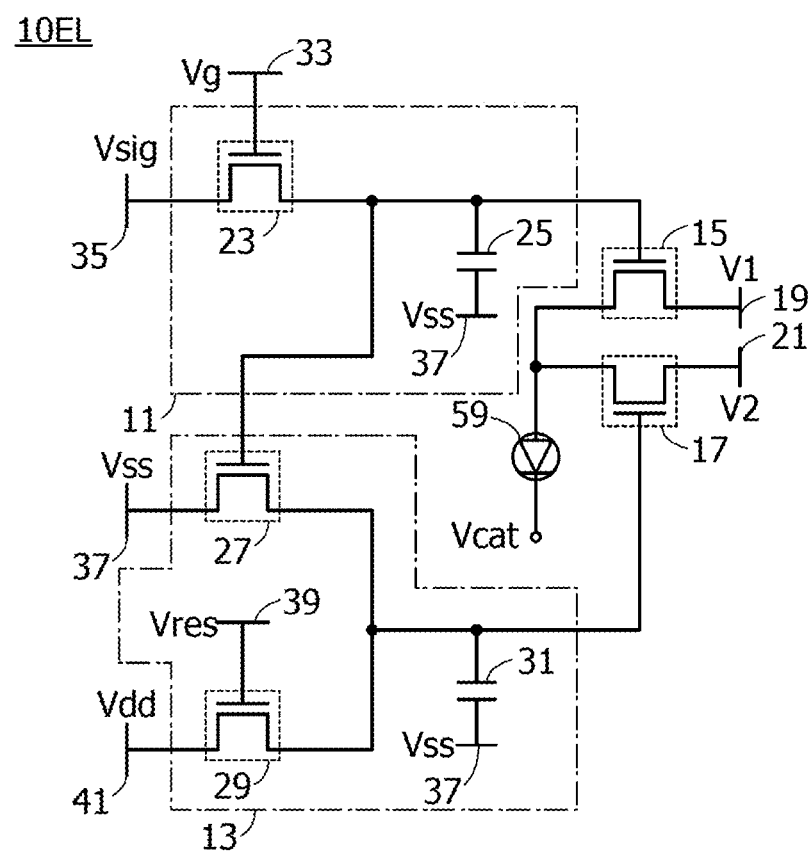
FIG. 7 is a circuit diagram illustrating one embodiment of the present invention.

FIG. 7 illustrates a pixel 10EL as another example. The pixel 10EL is provided in a display device that includes a light-emitting element 59 instead of the liquid crystal element 14 in the pixel 10 illustrated in FIG. 1A.

One of a pair of electrodes of the light-emitting element 59 is connected to one of the source and the drain of each of the transistors 15 and 17. The other electrode of the light-emitting element 59 is connected to a wiring Vcat serving as a cathode. Examples of the light-emitting element 59 include an organic electroluminescent element (also referred to as an organic EL element). Note that the light-emitting element 59 is not limited to the organic EL element and may be an inorganic EL element containing an inorganic material.

Note that although FIG. 7 illustrates an example in which the light-emitting element 59 is used as a display element, one embodiment of the present invention is not limited thereto. Any of a variety of display elements can be used. Examples of display elements include elements including a display medium whose contrast, luminance, reflectance, transmittance, or the like is changed by electromagnetic action, such as an electroluminescent (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), or a display element using a micro electro mechanical system (MEMS), a digital micromirror device (DMD), a digital micro shutter (DMS), an interferometric modulator (IMOD) element, a MEMS shutter display element, an optical-interference-type MEMS display element, an electrowetting element, a piezoelectric ceramic display, and a carbon nanotube. Examples of display devices including EL elements include an EL display. Examples of display devices including electron emitters are a field emission display (FED) and an SED-type flat panel display (SED: surface-conduction electron-emitter display). Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device using electronic ink or electrophoretic elements include electronic paper. In a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as SRAM can be provided under the reflective electrodes, leading to lower power consumption.

Figure 8:
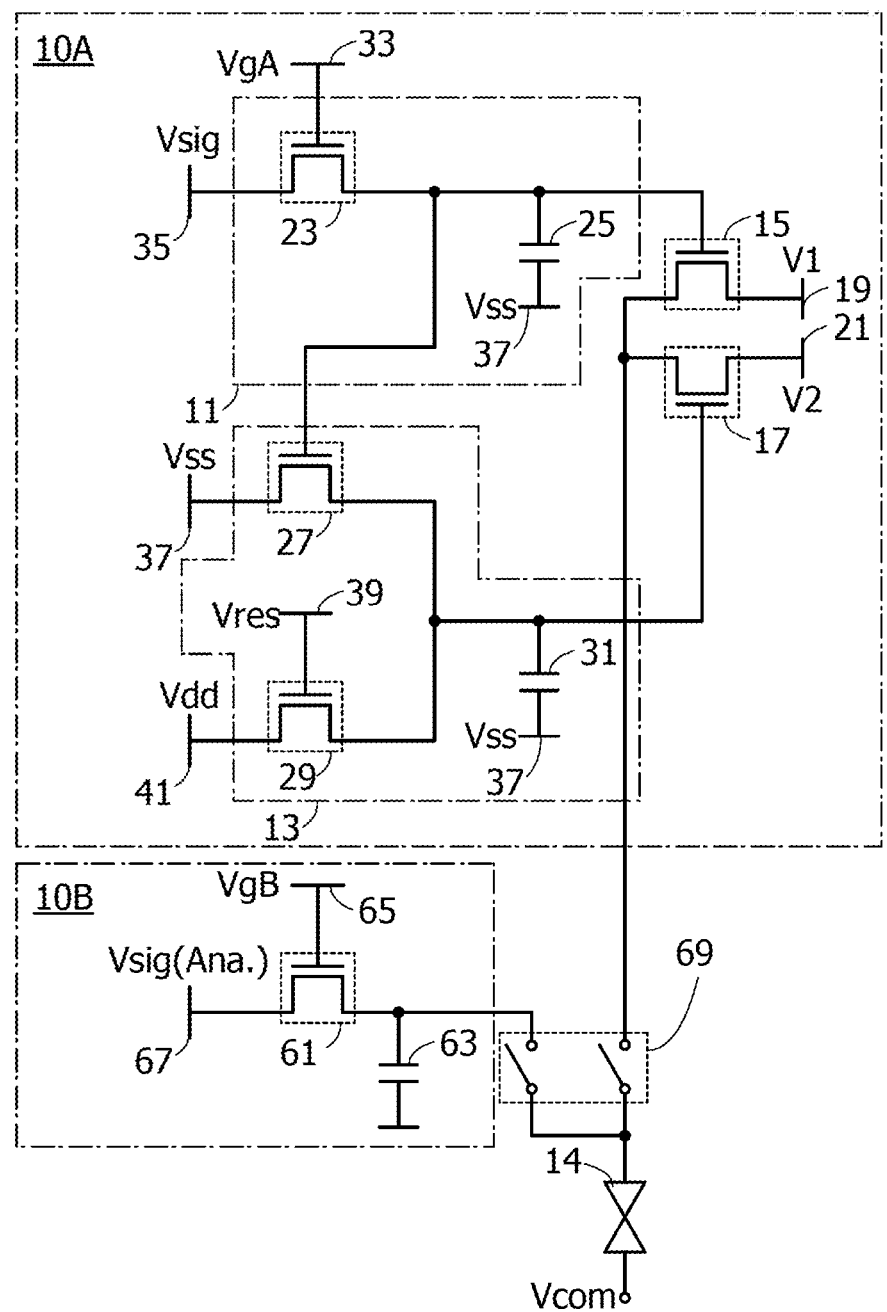
FIG. 8 is a circuit diagram illustrating one embodiment of the present invention.

In the above description, the pixel is used for displaying a two-level image; however, in the case where a multi-level image is displayed, the pixel may be switched to another pixel to perform display. For example, as shown in FIG. 8, a pixel 10B is provided adjacent to a pixel 10A which corresponds to the pixel 10 illustrated in FIG. 1A. The connection between the liquid crystal element 14 and the pixel 10A or 10B is changed by a switch 69.

The pixel 10B includes a transistor 61 and a capacitor 63, thereby having a so-called one-transistor and one-capacitor structure. The transistor 61 is used as a switch. The transistor 61 is turned on or off depending on a scan signal VgB which is supplied to a wiring 65 connected to a gate of the transistor 61. One of a source and a drain of the transistor 61 is connected to a wiring 67 supplied with a data voltage Vsig (Ana.) with an analog value. When the switch 69 is switched and the data voltage Vsig (Ana.) is written to the capacitor 63 connected to the other of the source and the drain of the transistor 61, multi-level display can be performed.

In the aforementioned liquid crystal display device that is one embodiment of the present invention, a potential corresponding to data can be held in a pixel without being influenced by charge leakage unlike in an SRAM. With the pixel structure of one embodiment of the present invention, a node allowing charge to be held is not directly connected to a liquid crystal element but is connected to a transistor including a semiconductor layer using an oxide semiconductor. This reduces the leakage of charge through the liquid crystal element, preventing data loss and reducing power consumption.

Also in the liquid crystal display device that is one embodiment of the present invention, a written data voltage can be held in a circuit where data can be held during the period almost equal to that in an SRAM. Hence, the operation of a driver circuit can be stopped when a still image is displayed, whereby the power consumption can be reduced.

In addition, the liquid crystal display device that is one embodiment of the present invention is a reflective liquid crystal display device; accordingly, the power consumed by a backlight can be reduced. In the reflective liquid crystal display device, transistors in a pixel can be provided to overlap with a pixel electrode. Therefore, even when the number of transistors in the pixel increases, the pixel size is not reduced and display quality can be maintained.

The structures shown in this embodiment can be used in appropriate combination with any of the structures shown in the other embodiments.

Embodiment 2

Figure 9A:
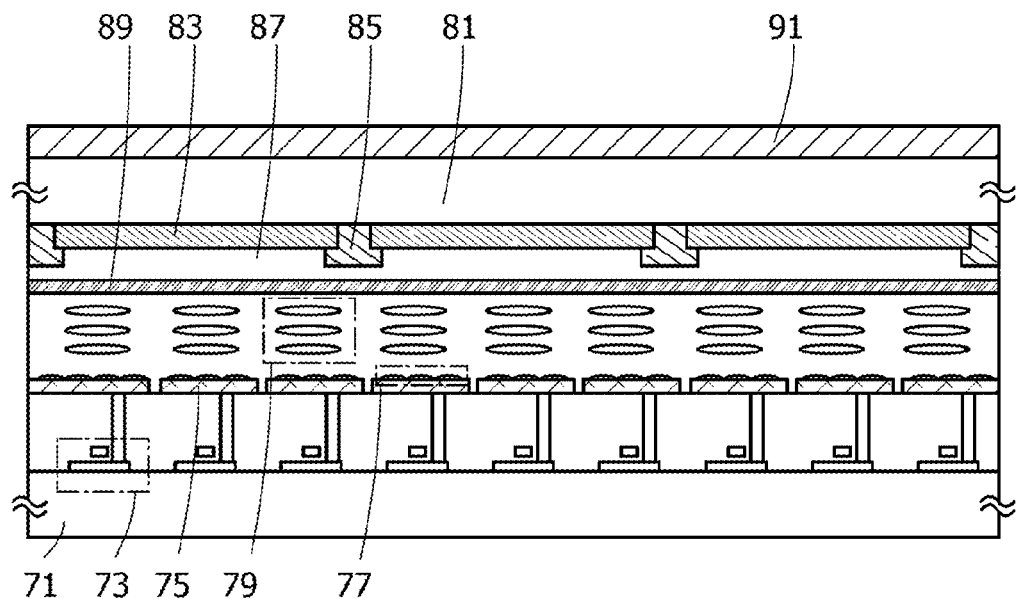
FIGS. 9A and 9B are cross-sectional schematic views each illustrating one embodiment of the present invention.
Figure 9B:
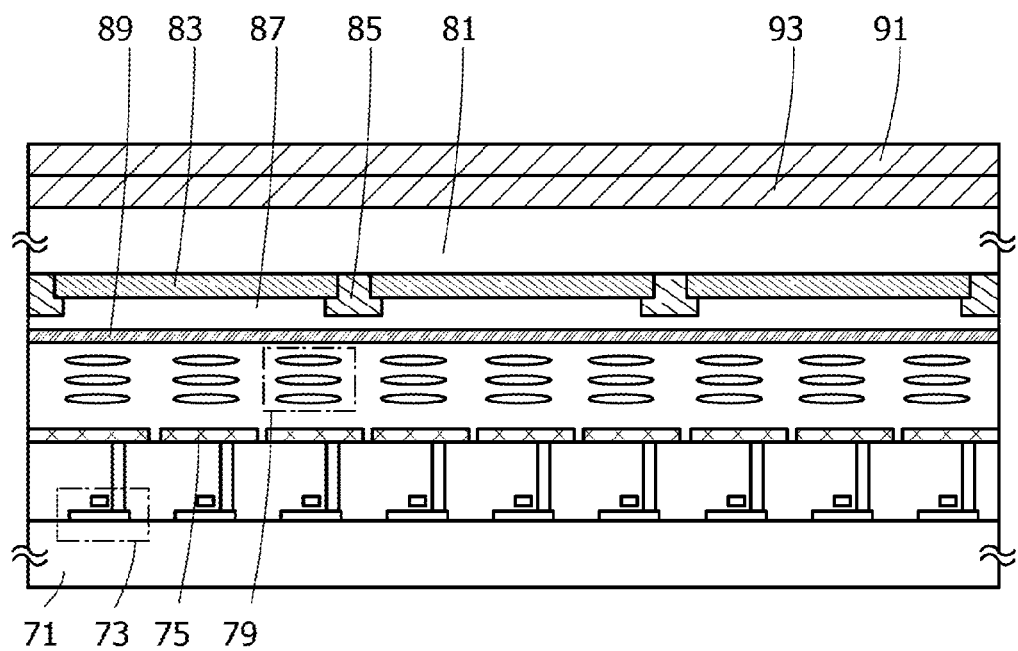

Described in this embodiment are examples of schematic cross-sectional structures that can be used for the liquid crystal display device described above. Here, structure examples of the schematic cross section of the liquid crystal display device will be described with reference to cross-sectional views of FIGS. 9A and 9B. FIGS. 9A and 9B show examples of the cross-sectional views of a reflective liquid crystal display device.

The cross-sectional schematic view of FIG. 9A illustrates an element substrate 71, a transistor 73, a conductive layer 75 serving as a pixel electrode, a depression and projection portion 77, a liquid crystal 79, a counter substrate 81, a coloring layer 83, a light-shielding layer 85, an insulating layer 87, a conductive layer 89 serving as a counter electrode, and a polarizing plate 91.

FIG. 9B illustrates a structure different from that in the cross-sectional schematic view of FIG. 9A. In FIG. 9B, a light diffusion layer 93 is provided between the counter substrate 81 and the polarizing plate 91 in addition to the components illustrated in FIG. 9A. Such a structure is preferable because the depression and projection portion 77, which is formed by processing a surface of a conductive layer, can be omitted.

The components illustrated in FIGS. 9A and 9B will be described below.

There is no particular limitation on a material and the like of the element substrate 71 and the counter substrate 81 as long as the material has heat resistance high enough to withstand at least heat treatment performed later. For example, a glass substrate, a ceramic substrate, a quartz substrate, or a sapphire substrate may be used as the element substrate 71 and the counter substrate 81. In the case where a glass substrate is used as the element substrate 71 and the counter substrate 81, a glass substrate having any of the following sizes can be used: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm) Thus, a large-sized liquid crystal display device can be manufactured.

Alternatively, a flexible substrate may be used as the element substrate 71, and the transistor may be provided directly on the flexible substrate. A separation layer may be provided between the element substrate 71 and the transistor. The separation layer can be used when part or the whole of an element portion formed over the separation layer is completed, separated from the element substrate 71, and transferred to another substrate. In such a case, the transistor can be transferred to a substrate having low heat resistance or a flexible substrate as well.

That is, the transistor can be formed using a variety of substrates. There is no particular limitation on the type of a substrate. Examples of the substrate include a semiconductor substrate (e.g., a single crystal substrate or a silicon substrate), an SOI substrate, a glass substrate, a quartz substrate, a plastic substrate, a metal substrate, a stainless steel substrate, a substrate including stainless steel foil, a tungsten substrate, a substrate including tungsten foil, a flexible substrate, an attachment film, paper including a fibrous material, and a base material film. Examples of a glass substrate include a barium borosilicate glass substrate, an aluminoborosilicate glass substrate, and a soda lime glass substrate. Examples of a flexible substrate, an attachment film, and a base material film include plastics typified by polyethylene terephthalate (PET), polyethylene naphthalate (PEN), and polyether sulfone (PES); a synthetic resin of acrylic or the like; a film made of polypropylene, polyester, polyvinyl fluoride, polyvinyl chloride, or the like; an inorganic film formed by evaporation; a film made of polyamide, polyimide, aramid, or epoxy; and paper. Specifically, when a transistor is formed using a semiconductor substrate, a single crystal substrate, an SOI substrate, or the like, the transistor can have few variations in characteristics, size, shape, or the like, high current supply capability, and a small size. A circuit using such transistors achieves lower power consumption of the circuit or higher integration of the circuit.

For the above separation layer, for example, a stacked inorganic films of a tungsten film and a silicon oxide film, or an organic resin film of polyimide or the like formed over a substrate can be used.

In other words, a transistor may be formed using one substrate, and then transferred to another substrate. Examples of a substrate to which a transistor is transferred include, in addition to the above-described substrates over which transistors can be formed, a paper substrate, a cellophane substrate, an aramid film substrate, a polyimide film substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, and a rubber substrate. With the use of such a substrate, a transistor with excellent properties or low power consumption, or a device with high durability can be formed, and the device can have high heat resistance and a reduced weight or thickness.

Note that all the circuits which are necessary to realize a desired function can be formed using one substrate (e.g., a glass substrate, a plastic substrate, a single crystal substrate, or an SOI substrate). In this manner, the cost can be reduced by a reduction in the number of components or reliability can be improved by a reduction in the number of connection points to circuit components.

Note that not all the circuits which are necessary to realize the predetermined function are needed to be formed using one substrate. That is, part of the circuits which are necessary to realize the predetermined function may be formed using a substrate and another part of the circuits which are necessary to realize the predetermined function may be formed using another substrate. For example, part of the circuits which are necessary to realize the predetermined function can be formed using a glass substrate and another part of the circuits which are necessary to realize the predetermined function can be formed using a single crystal substrate (or an SOI substrate). The single crystal substrate over which the another part of the circuits which are necessary to realize the predetermined function (such a substrate is also referred to as an IC chip) can be connected to the glass substrate by COG (chip on glass), and the IC chip can be provided over the glass substrate. Alternatively, the IC chip can be connected to the glass substrate by TAB (tape automated bonding), COF (chip on film), SMT (surface mount technology), a printed circuit board, or the like. When part of the circuits is thus formed over the same substrate as a pixel portion, the cost can be reduced by a reduction in the number of components or reliability can be improved by a reduction in the number of connection points between circuit components. In particular, a circuit in a portion where a driving voltage is high, a circuit in a portion where a driving frequency is high, or the like consumes much power in many cases. In view of the above, such a circuit is formed over a substrate (e.g., a single crystal substrate) different from a substrate over which a pixel portion is formed, whereby an IC chip is formed. The use of this IC chip prevents an increase in power consumption.

The transistor 73 can have a bottom-gate structure or a top-gate structure. Note that examples of the structure of the transistor will be described in detail in the following embodiment.

The conductive layer 75 can be formed using a metal material having a light-reflecting property. For example, the conductive layer 75 can be formed using one or more kinds of materials selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy of any of these metals; and a nitride of any of these metals. The conductive layer 75 may be stacked over a material having a light-transmitting property. The depression and projection portion 77 may be formed by processing the surface of the conductive layer 75 by etching or the like, or may be obtained by forming the conductive layer 75 over a structure body such as a conductive layer or an insulating layer.

Note that the structure body under the conductive layer 75 can be formed using an organic or inorganic material, typically, a visible light curable resin, an ultraviolet curable resin, or a thermosetting resin. For example, an acrylic resin, an epoxy resin, or an amine resin can be used. Note that the structure body may have a stacked structure of thin films.

For the coloring layer 83, a color filter for transmitting light in a red wavelength range, a color filter for transmitting light in a green wavelength range, a color filter for transmitting light in a blue wavelength range, or the like can be used. Each color filter is formed in a desired position with a known material by a printing method, an inkjet method, an etching method using a photolithography technique, or the like.

The light-shielding layer 85 is formed in a desired position with a known material having a light-blocking property by a printing method, an inkjet method, an etching method using a photolithography technique, or the like The insulating layer 87 has a function of protecting the coloring layer 83 and the light-shielding layer 85. The insulating layer 87 can be formed using an acrylic-based resin or the like.

The conductive layer 89 can be formed using a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

There is no particular limitation on the polarizing plate 91 as long as it can produce linearly polarized light from natural light or circularly polarized light. For example, a polarizing plate whose optical anisotropy is obtained by disposing dichroic substances in one direction can be used. Such a polarizing plate can be formed in such a manner that an iodine-based compound or the like is adsorbed to a film such as a polyvinyl alcohol film and the film is stretched in one direction. Note that as the dichroic substance, a dye-based compound or the like as well as an iodine-based compound can be used.

The light diffusion layer 93 is formed in a desired position with a variety of materials such as a transparent resin to which fine particles are added.

Although not illustrated in FIGS. 9A and 9B, an optical member such as an alignment film, a half-wave plate, or a quarter-wave plate.

The structures shown in this embodiment can be used in appropriate combination with any of the structures shown in the other embodiments. Hence, in the liquid crystal display device that is one embodiment of the present invention, the power consumed by a backlight can be reduced. In addition, because a reflective liquid crystal display device is obtained, transistors in a pixel can be provided to overlap with a pixel electrode. Therefore, even when the number of transistors in the pixel increases, the pixel size is not reduced and display quality can be maintained.

Embodiment 3

Figure 10A:
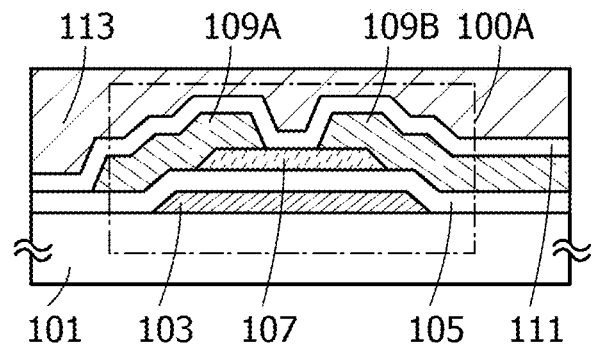
FIGS. 10A to 10C are cross-sectional schematic views each illustrating one embodiment of the present invention.
Figure 10B:
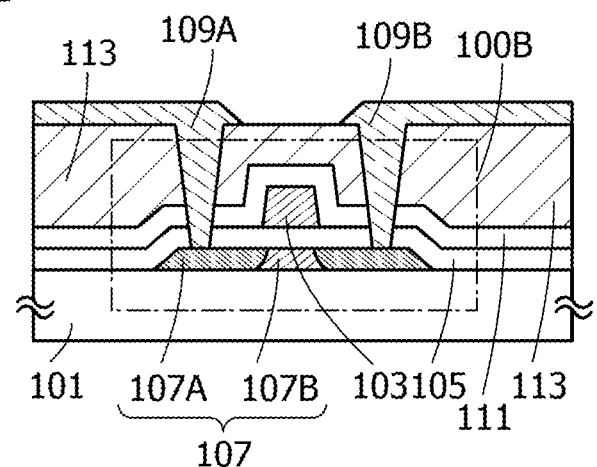
Figure 10C:
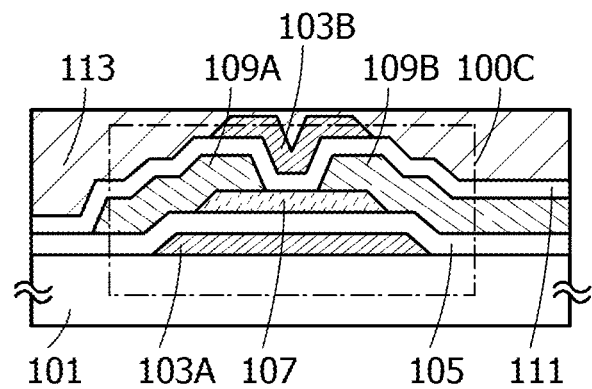

Described in this embodiment are examples of structures of a transistor that can be used for the liquid crystal display device described above. Here, structure examples of the cross section of the transistor will be described with reference to cross-sectional views of FIGS. 10A to 10C. FIG. 10A is a cross-sectional view of a bottom-gate transistor. FIG. 10B is a cross-sectional view of a top-gate transistor. FIG. 10C is a cross-sectional view of a dual-gate transistor.

A transistor 100A illustrated in FIG. 10A includes a conductive layer 103, an insulating layer 105, a semiconductor layer 107, a conductive layer 109A, a conductive layer 109B, an insulating layer 111, and an insulating layer 113 over a substrate 101.

Note that FIG. 10A shows a cross-sectional view of a channel-etched transistor with the bottom-gate structure; however, a channel-protective transistor may also be used. The semiconductor layer 107 may have a layered structure although FIG. 10A shows a single-layer semiconductor layer 107.

A transistor 100B illustrated in FIG. 10B includes the semiconductor layer 107 provided with a semiconductor layer 107A and a semiconductor layer 107B, the insulating layer 105, the conductive layer 103, the insulating layer 111, the insulating layer 113, the conductive layer 109A, and the conductive layer 109B over the substrate 101.

Note that FIG. 10B shows, but is not limited to, the top-gate structure in which the conductive layers 109A and 109B are connected to each other through openings formed in the insulating layer 113. For example, the conductive layers 109A and 109B may be formed directly on the semiconductor layer 107 without provision of the openings.

A transistor 100C illustrated in FIG. 10C includes a conductive layer 103A, the insulating layer 105, the semiconductor layer 107, the conductive layer 109A, the conductive layer 109B, the insulating layer 111, a conductive layer 103B, and the insulating layer 113 over the substrate 101.

The components illustrated in FIGS. 10A to 10C will be described below.

The substrate 101 is similar to the element substrate 71 or the counter substrate 81 described in the above embodiment, and therefore will not be described.

For the conductive layers 103, 103A, 103B, 109A, and 109B, a metal element selected from aluminum, chromium, copper, tantalum, titanium, molybdenum, and tungsten, an alloy containing any of these metal elements as a component, an alloy containing these metal elements in combination, or the like can be used. Furthermore, one or more metal elements selected from manganese and zirconium may be used. In addition, the conductive layers 103, 103A, 103B, 109A, and 109B may have a single-layer structure or a stacked-layer structure of two or more layers. Examples of the structure include a single-layer structure of an aluminum film containing silicon, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, and a three-layer structure in which a titanium film, an aluminum film, and a titanium film are stacked in this order. Alternatively, an alloy film or a nitride film in which aluminum is combined with one or more elements selected from titanium, tantalum, tungsten, molybdenum, chromium, neodymium, and scandium may be used.

The conductive layers 103, 103A, 103B, 109A, and 109B can be formed using a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added. It is also possible to use a layered structure of the light-transmitting conductive material and the aforementioned metal element.

The insulating layers 105 and 111 each may be formed to have a single-layer structure or a stacked-layer structure using, for example, one or more of silicon oxide, silicon oxynitride, silicon nitride oxide, silicon nitride, aluminum oxide, hafnium oxide, gallium oxide, Ga—Zn-based metal oxide, silicon nitride, and the like. The insulating layers 105 and 111 each may be formed using a high-k material such as hafnium silicate ($HfSiO_x$), hafnium silicate to which nitrogen is added ($HfSi_xO_yN_z$), hafnium aluminate to which nitrogen is added ($HfAl_xO_yN_z$), hafnium oxide, or yttrium oxide, so that gate leakage current of the transistor can be reduced.

The insulating layer 113 may be formed by a CVD method, a sputtering method, or the like to have a single-layer structure or a stacked-layer structure using, for example, silicon oxide, silicon oxynitride, or silicon nitride. The insulating layer 113 can also be made using an organic resin such as an acrylic resin, a polyimide resin, a benzocyclobutene-based resin, a siloxane-based resin, a polyamide resin, or an epoxy resin.

The semiconductor layers 107, 107A, and 107B each may be formed to have a single-layer structure or a stacked-layer structure using, typically, In—Ga oxide, In—Zn oxide, and In-M-Zn oxide (M represents Al, Ti, Ga, Y, Zr, La, Ce, Nd, Sn, or Hf).

The semiconductor layers 107, 107A, and 107B each may be an In-M-Zn oxide layer having any of the following atomic ratios of In to M, when Zn and O are not taken into consideration: the atomic percentage of In is smaller than 50 atomic % and the atomic percentage of M is larger than or equal to 50 atomic %, and the atomic percentage of In is smaller than 25 atomic % and the atomic percentage of M is larger than or equal to 75 atomic %.

The energy gap of each of the semiconductor layers 107, 107A, and 107B is 2 eV or more, preferably 2.5 eV or more, and more preferably 3 eV or more. The off-state current of the transistor can be reduced by using an oxide semiconductor having such a wide energy gap.

For the semiconductor layers 107, 107A, and 107B, an In—Ga—Zn oxide containing In, Ga, and Zn at an atomic ratio of 1:1:1, 1:1:1.2, or 3:1:2 can be used. Note that the atomic ratio of each of the semiconductor layers 107, 107A, and 107B varies within a range of ±20% as an error.

Note that the conductivity of the semiconductor layer 107A is preferably higher than that of the semiconductor layer 107B. To increase the conductivity of the semiconductor layer 107A, a rare gas or the like containing argon is preferably added to the semiconductor layer 107A in a self-aligned manner with the conductive layer 103 serving as a gate electrode used as a mask. Such a structure reduces the number of masks.

The structures shown in this embodiment can be used in appropriate combination with any of the structures shown in the other embodiments.

Embodiment 4

Described in this embodiment will be one embodiment that can be applied to an oxide semiconductor film in the transistor included in the liquid crystal display device described in the above embodiments.

The oxide semiconductor film may include one or more of the following: an oxide semiconductor having a single-crystal structure (hereinafter referred to as a single-crystal oxide semiconductor); an oxide semiconductor having a polycrystalline structure (hereinafter referred to as a polycrystalline oxide semiconductor); an oxide semiconductor having a microcrystalline structure (hereinafter referred to as a microcrystalline oxide semiconductor), and an oxide semiconductor having an amorphous structure (hereinafter referred to as an amorphous oxide semiconductor). Further, the oxide semiconductor film may be formed using a CAAC-OS film. Furthermore, the oxide semiconductor film may include an amorphous oxide semiconductor and an oxide semiconductor having a crystal grain. A CAAC-OS film and a microcrystalline oxide semiconductor film are described below as typical examples.

First, a CAAC-OS film is described.

The CAAC-OS film is an oxide semiconductor film having a plurality of c-axis aligned crystal parts.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each layer of metal atoms has a morphology reflecting a surface over which the CAAC-OS film is formed (hereinafter, a surface over which the CAAC-OS film is formed is referred to as a formation surface) or a top surface of the CAAC-OS film, and is arranged parallel to the formation surface or the top surface of the CAAC-OS film.

On the other hand, according to the TEM image of the CAAC-OS film observed in a direction substantially perpendicular to the sample surface (plan-view TEM image), metal atoms are arranged in a triangular or hexagonal configuration in the crystal parts. However, there is no regularity of arrangement of metal atoms between different crystal parts.

Figure 15A:
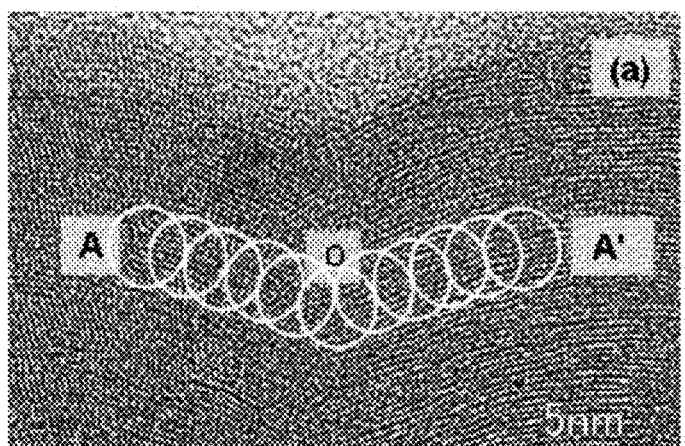
FIGS. 15A to 15C are cross-sectional TEM images and a local Fourier transform image of an oxide semiconductor.
Figure 15B:
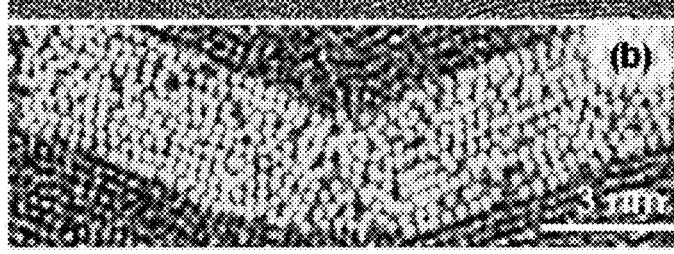

FIG. 15a is a cross-sectional TEM image of a CAAC-OS film. FIG. 15b is a cross-sectional TEM image obtained by enlarging the image of FIG. 15a. In FIG. 15b, atomic arrangement is highlighted for easy understanding.

Figure 15C:
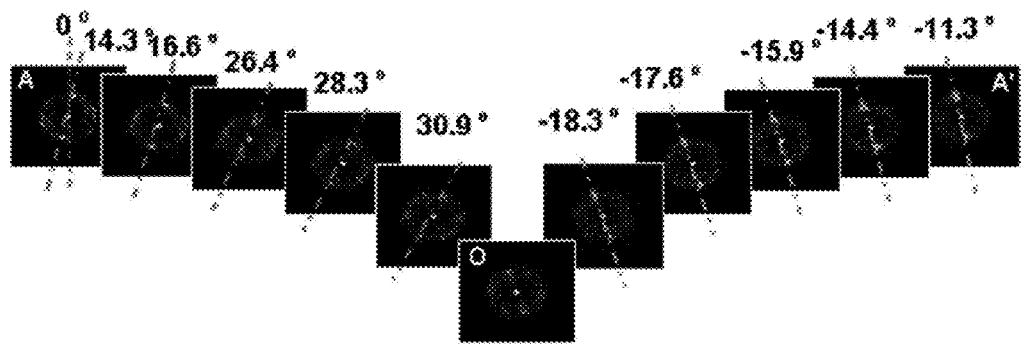

FIG. 15c is local Fourier transform images of regions each surrounded by a circle (the diameter is about 4 nm) between A and O and between O and A' in FIG. 15a. C-axis alignment can be observed in each region in FIG. 15c. The c-axis direction between A and O is different from that between O and A', which indicates that a grain in the region between A and O is different from that between O and A'. In addition, the angle of the c-axis between A and O continuously and gradually changes, for example, 14.3°, 16.6°, and 26.4°. Similarly, the angle of the c-axis between O and A' continuously changes, for example, −18.3°, −17.6°, and −15.9°.

Note that in an electron diffraction pattern of the CAAC-OS film, spots (bright spots) indicating alignment are shown. For example, when electron diffraction with an electron beam having a diameter of 1 nm or more and 30 nm or less (such electron diffraction is also referred to as nanobeam electron diffraction) is performed on the top surface of the CAAC-OS film, spots are observed (see FIG. 16A).

From the results of the cross-sectional TEM image and the plan-view TEM image, alignment is found in the crystal parts in the CAAC-OS film.

Most of the crystal parts included in the CAAC-OS film each fit inside a cube whose one side is less than 100 nm. Thus, there is a case where a crystal part included in the CAAC-OS film fits inside a cube whose one side is less than 10 nm, less than 5 nm, or less than 3 nm. Note that when a plurality of crystal parts included in the CAAC-OS film are connected to each other, one large crystal region is formed in some cases. For example, a crystal region with an area of 2500 nm$^2$ or more, 5 μm$^2$ or more, or 1000 μm$^2$ or more is observed in some cases in the plan-view TEM image.

A CAAC-OS film is subjected to structural analysis with an X-ray diffraction (XRD) apparatus. For example, when the CAAC-OS film including an InGaZnO$_4$ crystal is analyzed by an out-of-plane method, a peak appears frequently when the diffraction angle (2θ) is around 31°. This peak is derived from the (009) plane of the InGaZnO$_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray is incident on a sample in a direction substantially perpendicular to the c-axis, a peak appears frequently when 2θ is around 56°. This peak is derived from the (110) plane of the InGaZnO$_4$ crystal. Here, analysis (φ scan) is performed under conditions where the sample is rotated around a normal vector of a sample surface as an axis (φ axis) with 2θ fixed at around 56°. In the case where the sample is a single crystal oxide semiconductor film of InGaZnO$_4$, six peaks appear. The six peaks are derived from crystal planes equivalent to the (110) plane. On the other hand, in the case of a CAAC-OS film, a peak is not clearly observed even when φ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface. Thus, for example, in the case where the shape of the CAAC-OS film is changed by etching or the like, the c-axis might not be necessarily parallel to a normal vector of a formation surface or a normal vector of a top surface of the CAAC-OS film.

Distribution of c-axis aligned crystal parts in the CAAC-OS film is not necessarily uniform. For example, in the case where crystal growth leading to the crystal parts of the CAAC-OS film occurs from the vicinity of the top surface of the film, the proportion of the c-axis aligned crystal parts in the vicinity of the top surface is higher than that in the vicinity of the formation surface in some cases. Furthermore, when an impurity is added to the CAAC-OS film, a region to which the impurity is added may be altered and the proportion of the c-axis aligned crystal parts in the CAAC-OS film might vary depending on regions.

Note that when the CAAC-OS film with an InGaZnO$_4$ crystal is analyzed by an out-of-plane method, a peak may also be observed when 2θ is around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Therefore, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released and might behave like fixed electric charge. Thus, the transistor including the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Next, a microcrystalline oxide semiconductor film is described.

In an image obtained with the TEM, crystal parts cannot be found clearly in the microcrystalline oxide semiconductor film in some cases. In most cases, the size of a crystal part in the microcrystalline oxide semiconductor film is greater than or equal to 1 nm and less than or equal to 100 nm, or greater than or equal to 1 nm and less than or equal to 10 nm. A microcrystal with a size greater than or equal to 1 nm and less than or equal to 10 nm, or a size greater than or equal to 1 nm and less than or equal to 3 nm is specifically referred to as nanocrystal (nc). An oxide semiconductor film including nanocrystal is referred to as a nanocrystalline oxide semiconductor (nc-OS) film. In an image obtained with TEM, a grain boundary cannot be found clearly in the nc-OS film in some cases.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic order. Note that there is no regularity of crystal orientation between different crystal parts in the nc-OS film. Thus, the orientation of the whole film is not observed. Accordingly, in some cases, the nc-OS film cannot be distinguished from an amorphous oxide semiconductor depending on an analysis method. For example, when the nc-OS film is subjected to structural analysis by an out-of-plane method with an XRD apparatus using an X-ray having a diameter larger than that of a crystal part, a peak showing a crystal plane does not appear. A diffraction pattern like a halo pattern appears in a selected-area electron diffraction pattern of the nc-OS film obtained by using an electron beam having a probe diameter (e.g., larger than or equal to 50 nm) larger than the diameter of a crystal part. Meanwhile, spots are shown in a nanobeam electron diffraction pattern of the nc-OS film obtained by using an electron beam having a probe diameter close to, or smaller than the diameter of a crystal part. In a nanobeam electron diffraction pattern of the nc-OS film, regions with high luminance in a circular (ring) pattern are shown in some cases. Furthermore, in a nanobeam electron diffraction pattern of the nc-OS film, a plurality of circumferentially distributed spots are observed in some cases (see FIG. 16B).

The nc-OS film is an oxide semiconductor film that has high regularity as compared to an amorphous oxide semiconductor film. Thus, the nc-OS film has a lower density of defect states than an amorphous oxide semiconductor film. Note that there is no regularity of crystal orientation between different crystal parts in the nc-OS film. Hence, the nc-OS film has a higher density of defect states than the CAAC-OS film.

Note that an oxide semiconductor film may be a stacked film including two or more kinds of an amorphous oxide semiconductor film, a microcrystalline oxide semiconductor film, and a CAAC-OS film, for example.

In the case where an oxide semiconductor film has a plurality of structures, the structures can be analyzed using nanobeam electron diffraction in some cases.

Figure 16A:
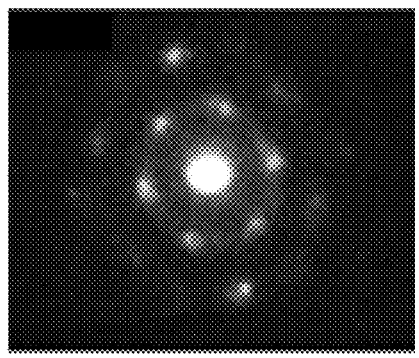
FIGS. 16A and 16B show nanobeam electron diffraction patterns of oxide semiconductor films.
Figure 16B:
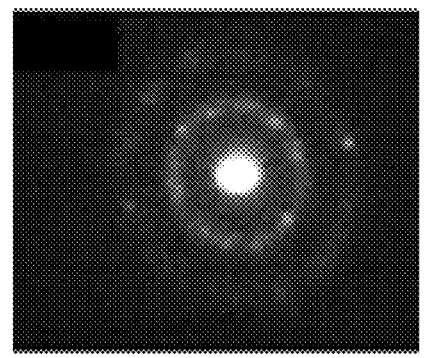
Figure 16C:
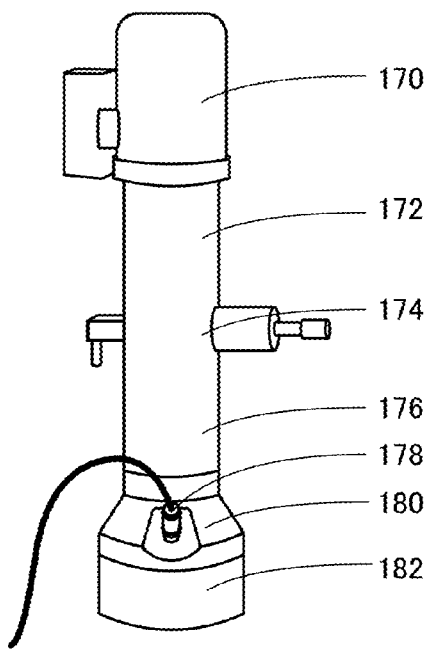
FIGS. 16C and 16D illustrate an example of a transmission electron diffraction measurement apparatus.

FIG. 16C illustrates a transmission electron diffraction measurement apparatus which includes an electron gun chamber 170, an optical system 172 below the electron gun chamber 170, a sample chamber 174 below the optical system 172, an optical system 176 below the sample chamber 174, an observation chamber 180 below the optical system 176, a camera 178 installed in the observation chamber 180, and a film chamber 182 below the observation chamber 180. The camera 178 is provided to face toward the inside of the observation chamber 180. Note that the film chamber 182 is not necessarily provided.

Figure 16D:
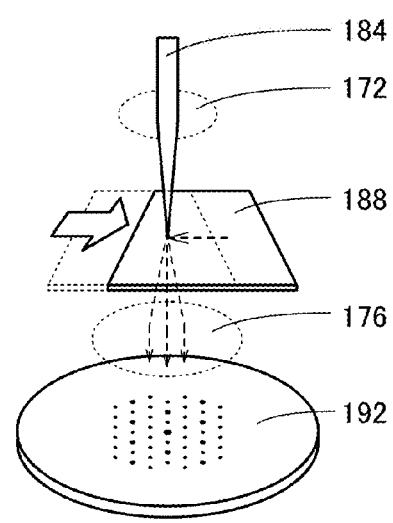

FIG. 16D illustrates an internal structure of the transmission electron diffraction measurement apparatus illustrated in FIG. 16C. In the transmission electron diffraction measurement apparatus, a substance 188 which is positioned in the sample chamber 174 is irradiated with electrons emitted from an electron gun installed in the electron gun chamber 170 through the optical system 172. Electrons passing through the substance 188 are incident on a fluorescent plate 192 provided in the observation chamber 180 through the optical system 176. On the fluorescent plate 192, a pattern corresponding to the intensity of the incident electrons appears, which allows measurement of a transmission electron diffraction pattern.

The camera 178 is installed so as to face the fluorescent plate 192 and can take an image of a pattern appearing on the fluorescent plate 192. An angle formed by a straight line which passes through the center of a lens of the camera 178 and the center of the fluorescent plate 192 and an upper surface of the fluorescent plate 192 is, for example, 15° or more and 80° or less, 30° or more and 75° or less, or 45° or more and 70° or less. As the angle is reduced, distortion of the transmission electron diffraction pattern taken by the camera 178 becomes larger. Note that if the angle is obtained in advance, the distortion of an obtained transmission electron diffraction pattern can be corrected. Note that the film chamber 182 may be provided with the camera 178. For example, the camera 178 may be set in the film chamber 182 so as to be opposite to the incident direction of electrons 184. In this case, a transmission electron diffraction pattern with less distortion can be taken from the rear surface of the fluorescent plate 192.

A holder for fixing the substance 188 that is a sample is provided in the sample chamber 174. The holder transmits electrons passing through the substance 188. The holder may have, for example, a function of moving the substance 188 in the direction of the X, Y, and Z axes. The movement function of the holder may have an accuracy of moving the substance in the range of, for example, 1 nm to 10 nm, 5 nm to 50 nm, 10 nm to 100 nm, 50 nm to 500 nm, and 100 nm to 1 µm. The range is preferably determined to be an optimal range for the structure of the substance 188.

Then, a method for measuring a transmission electron diffraction pattern of a substance by the transmission electron diffraction measurement apparatus described above will be described.

For example, changes in the structure of a substance can be observed by changing the irradiation position of the electrons 184 that are a nanobeam in the substance (or by scanning) as illustrated in FIG. 16D. At this time, when the substance 188 is a CAAC-OS film, a diffraction pattern shown in FIG. 16A is observed. When the substance 188 is an nc-OS film, a diffraction pattern shown in FIG. 16B is observed.

Even when the substance 188 is a CAAC-OS film, a diffraction pattern similar to that of an nc-OS film or the like is partly observed in some cases. Therefore, whether a CAAC-OS film is favorable can be determined by the proportion of a region where a diffraction pattern of a CAAC-OS film is observed in a predetermined area (also referred to as proportion of CAAC). In the case of a high quality CAAC-OS film, for example, the proportion of CAAC is higher than or equal to 50%, preferably higher than or equal to 80%, more preferably higher than or equal to 90%, and still preferably higher than or equal to 95%. Note that the proportion of a region where a diffraction pattern different from that of a CAAC-OS film is observed is referred to as the proportion of non-CAAC.

For example, transmission electron diffraction patterns were obtained by scanning a top surface of a sample including a CAAC-OS film obtained immediately after deposition (represented as "as-sputtered") and a top surface of a sample including a CAAC-OS subjected to heat treatment at 450° C. in an atmosphere containing oxygen. Here, the proportion of CAAC was obtained in such a manner that diffraction patterns were observed by scanning for 60 seconds at a rate of 5 nm/s and the obtained diffraction patterns were converted into still images every 0.5 seconds. Note that as an electron beam, a nanobeam with a probe diameter of 1 nm was used. The above measurement was also performed on six samples. The proportion of CAAC was calculated using the average value of the six samples.

Figure 17A:
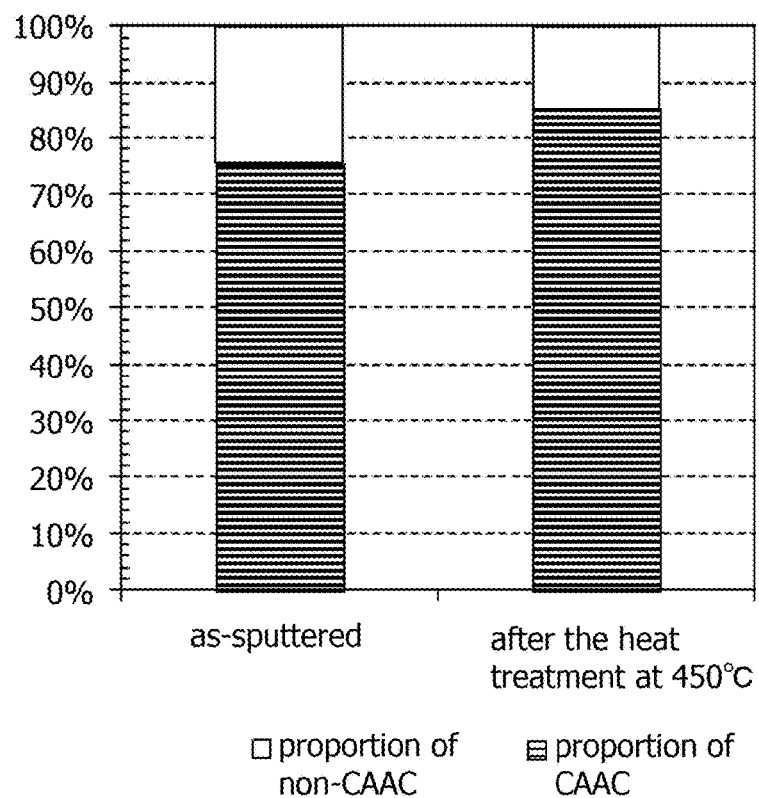
FIG. 17A shows an example of structural analysis by transmission electron diffraction measurement.

FIG. 17A shows the proportion of CAAC in each sample. The proportion of CAAC in the CAAC-OS film obtained immediately after the deposition was 75.7% (the proportion of non-CAAC was 24.3%). The proportion of CAAC in the CAAC-OS film subjected to the heat treatment at 450° C. was 85.3% (the proportion of non-CAAC was 14.7%). These results show that the proportion of CAAC obtained after the heat treatment at 450° C. is higher than that obtained immediately after the deposition. That is, heat treatment at high temperature (e.g., higher than or equal to 400° C.) reduces the proportion of non-CAAC (increases the proportion of CAAC). The above results also indicate that even when the temperature of the heat treatment is lower than 500° C., the CAAC-OS film can have a high proportion of CAAC.

Here, most of diffraction patterns different from that of a CAAC-OS film were similar to that of an nc-OS film. Furthermore, an amorphous oxide semiconductor film was not able to be observed in a measurement region. Thus, the results suggest that a region having a structure similar to that of an nc-OS film is rearranged by the heat treatment owing to the influence of the structure of an adjacent region, so that the region becomes CAAC.

Figure 17B:
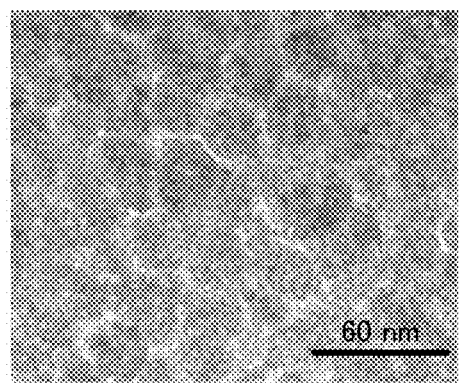
FIGS. 17B and 17C show planar TEM images.
Figure 17C:
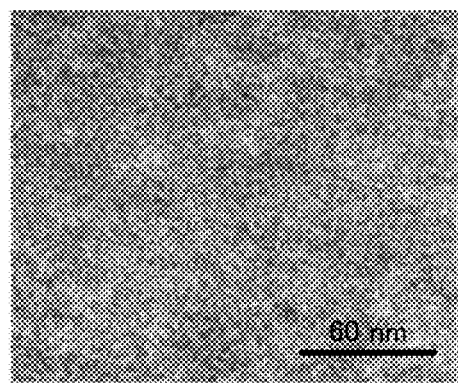

FIGS. 17B and 17C are planar TEM images of the CAAC-OS film obtained immediately after the deposition and the CAAC-OS film subjected to the heat treatment at 450° C., respectively. Comparison between FIGS. 17B and 17C shows that the CAAC-OS film subjected to the heat treatment at 450° C. has more even film quality. That is, the heat treatment at high temperature improves the film quality of the CAAC-OS film.

With such a measurement method, the structure of an oxide semiconductor film having a plurality of structures can be analyzed in some cases.

The structures, methods, and the like shown in this embodiment can be used in appropriate combination with any of the structures, methods, and the like shown in the other embodiments.

Embodiment 5

As described in Embodiment 1, with the pixel structure of the liquid crystal display device that is disclosed in one embodiment of the present invention, a written data voltage can be held during a long period and the writing interval can be increased. The liquid crystal display device of this embodiment can be driven by at least two methods (modes) to display images. The first driving mode is a conventional driving method of a liquid crystal display device, in which data is rewritten every frame. In the second driving mode, data rewriting is stopped after data writing is executed, that is, the refresh rate is reduced.

Moving images are displayed in the first driving mode. Still images are displayed in the second driving mode. In the second driving mode, driver circuits do not need to be operated for driving pixels, reducing power consumption.

In addition, a pixel electrode of the liquid crystal display device of one embodiment of the present invention has a function of reflecting external light. In other words, the liquid crystal display device of one embodiment of the present invention is a so-called reflective liquid crystal display device. Hence, displayed images can be made visible without a need of a backlight, resulting in lower power consumption.

An effect of reducing the refresh rate will be described here.

The eye strain is divided into two categories: nerve strain and muscle strain. The nerve strain is caused by prolonged looking at light emitted from a liquid crystal display device or blinking images. This is because the brightness stimulates and fatigues the retina and nerve of the eye and the brain. The muscle strain is caused by overuse of a ciliary muscle which works for adjusting the focus.

Figure 11A:
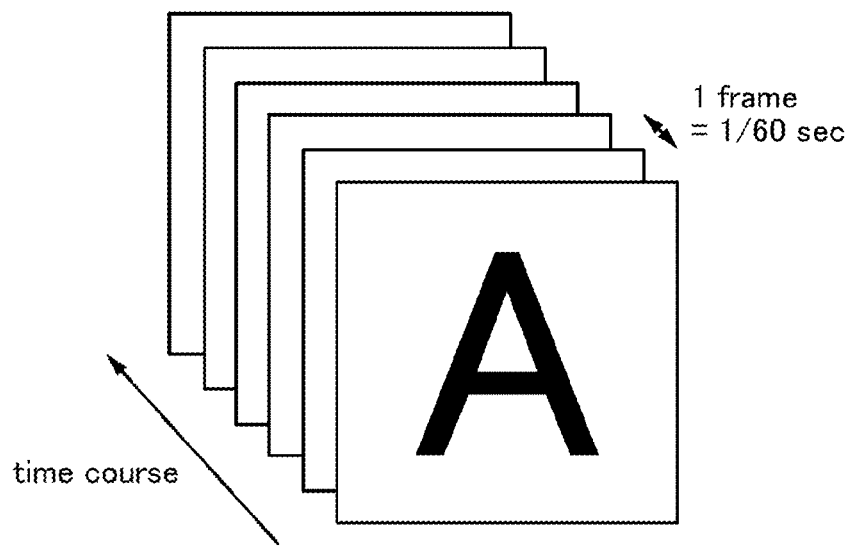
FIGS. 11A and 11B are conceptual diagrams illustrating examples of a driving method of a liquid crystal display device.

FIG. 11A is a schematic diagram illustrating display of a conventional liquid crystal display device. As illustrated in FIG. 11A, for the display of the conventional liquid crystal display device, image rewriting is performed 60 times per second. A prolonged looking at such a screen might stimulate the retina and nerve of the eye and the brain of a user and lead to eye strain.

Figure 11B:
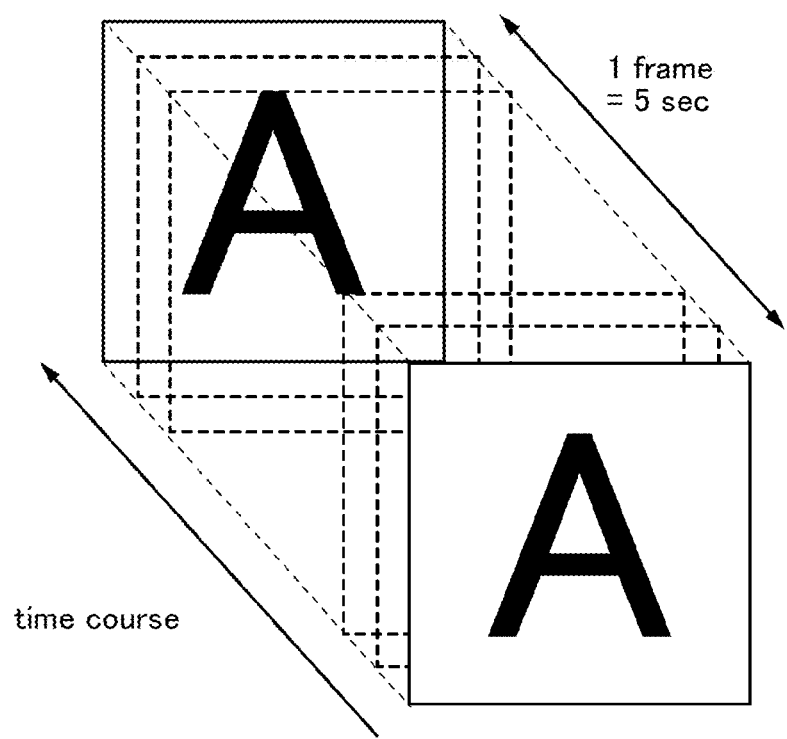

In contrast, when images are displayed in the liquid crystal display device of one embodiment of the present invention, for example, the number of times of image writing can be reduced to once every five seconds as shown in FIG. 11B. In that case, unlike in FIG. 11A, the same image can be seen for as long as possible and flickers on a screen perceived by a user can be reduced. This makes it possible to reduce stimuli to the retina and nerve of the eye and the brain of a user, resulting in less nerve strain.

One embodiment of the present invention can provide an eye-friendly liquid crystal display device.

The structures, methods, and the like shown in this embodiment can be used in appropriate combination with any of the structures, methods, and the like shown in the other embodiments.

Embodiment 6

In this embodiment, structure examples of electronic devices each including a liquid crystal display device of one embodiment of the present invention will be described. Furthermore, in this embodiment, a display module including a liquid crystal display device of one embodiment of the present invention will be described with reference to FIG. 12.

Figure 12:
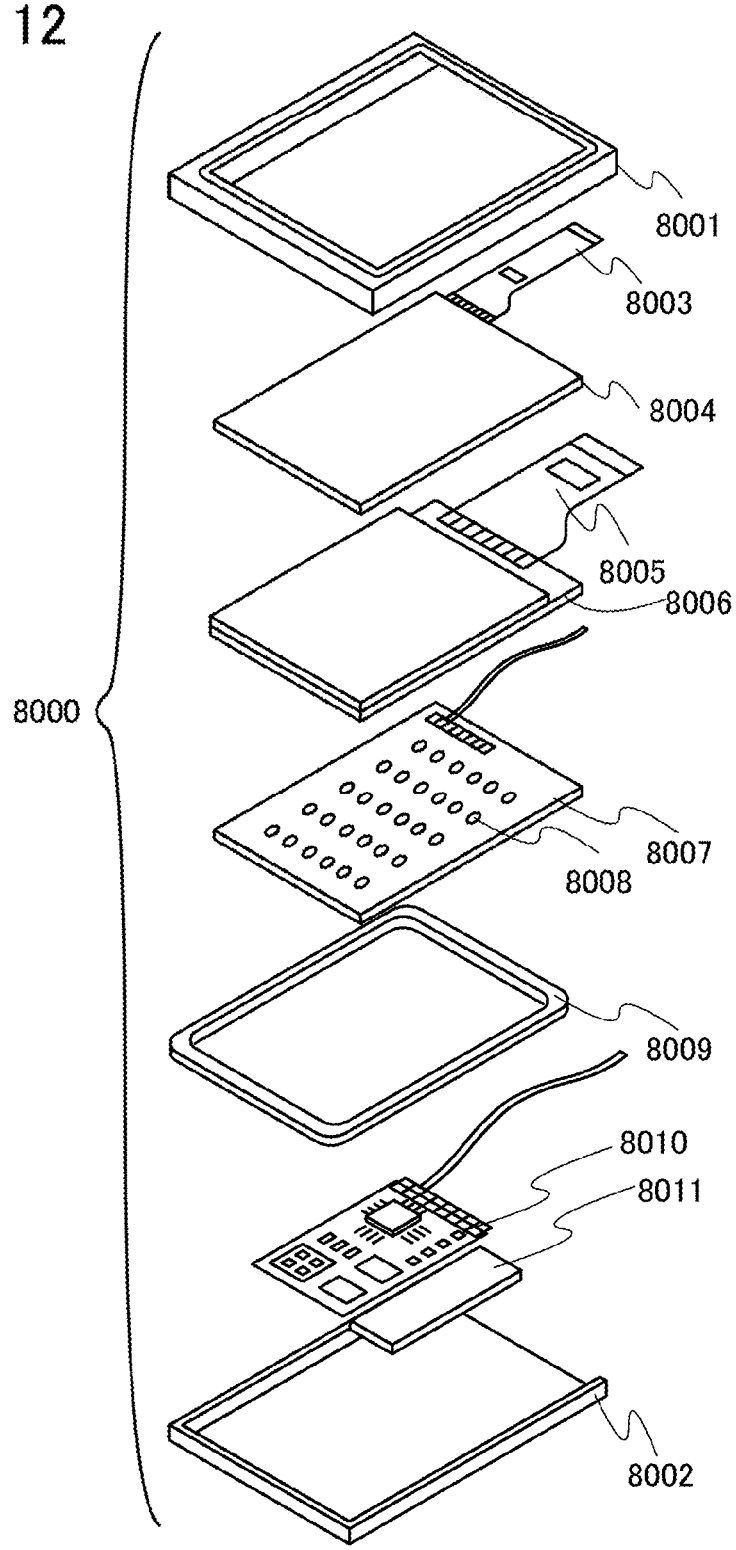
FIG. 12 illustrates a display module.

In a display module 8000 illustrated in FIG. 12, a touch panel 8004 connected to an FPC 8003, a display panel 8006 connected to an FPC 8005, a backlight unit 8007, a frame 8009, a printed board 8010, and a battery 8011 are provided between an upper cover 8001 and a lower cover 8002. Note that the backlight unit 8007, the battery 8011, the touch panel 8004, and the like are not provided in some cases.

The liquid crystal display device of one embodiment of the present invention can be used for, for example, the display panel 8006.

The shapes and sizes of the upper cover 8001 and the lower cover 8002 can be changed as appropriate in accordance with the sizes of the touch panel 8004 and the display panel 8006.

The touch panel 8004 can be a resistive touch panel or a capacitive touch panel and can be formed to overlap with the display panel 8006. A counter substrate (sealing substrate) of the display panel 8006 can have a touch panel function. A photosensor may be provided in each pixel of the display panel 8006 to form an optical touch panel. An electrode for a touch sensor may be provided in each pixel of the display panel 8006 so that a capacitive touch panel is obtained.

The backlight unit 8007 includes a light source 8008. The light source 8008 may be provided at an end portion of the backlight unit 8007 and a light diffusing plate may be used.

The frame 8009 protects the display panel 8006 and also functions as an electromagnetic shield for blocking electromagnetic waves generated by the operation of the printed board 8010. The frame 8009 may function as a radiator plate.

The printed board 8010 is provided with a power supply circuit and a signal processing circuit for outputting a video signal and a clock signal. As a power source for supplying power to the power supply circuit, an external commercial power source or a power source using the battery 8011 provided separately may be used. The battery 8011 can be omitted in the case of using a commercial power source.

The display module 8000 may be additionally provided with a member such as a polarizing plate, a retardation plate, or a prism sheet.

FIGS. 13A to 13H and FIGS. 14A to 14D illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, smell, or infrared ray), a microphone 5008, and the like.

Figure 13A:
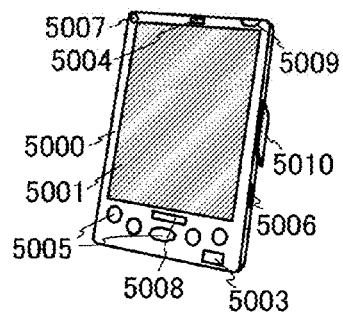
FIGS. 13A to 13H are external views of electronic devices of one embodiment.
Figure 13B:
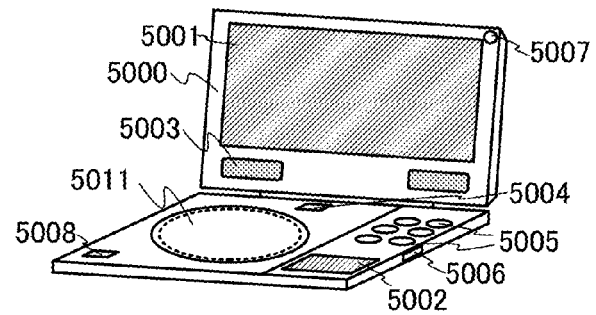
Figure 13C:
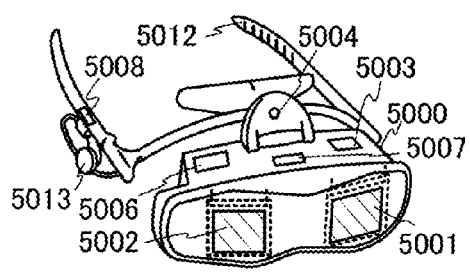
Figure 13D:
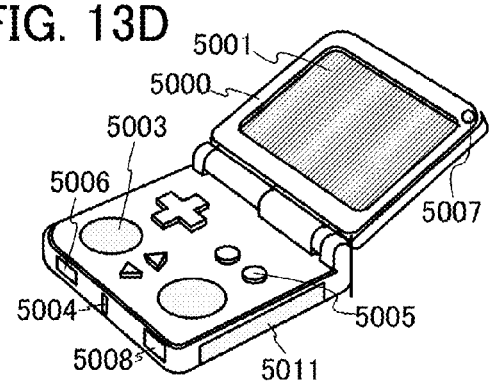
Figure 13E:
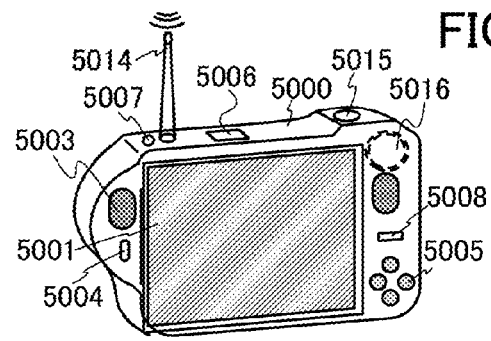
Figure 13F:
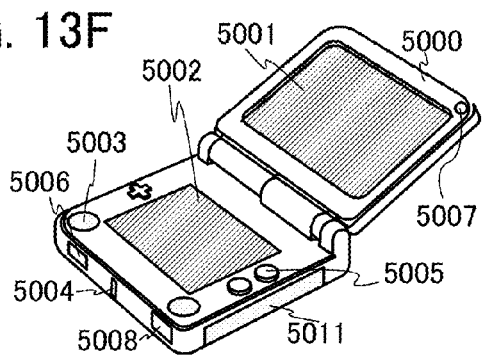
Figure 13G:
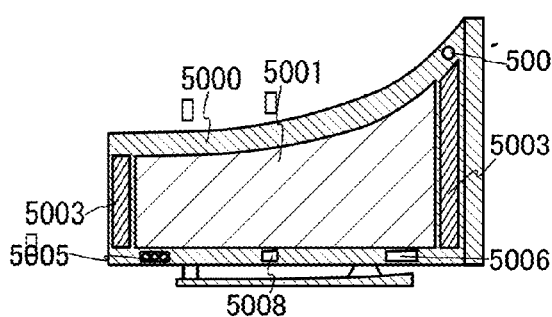
Figure 13H:
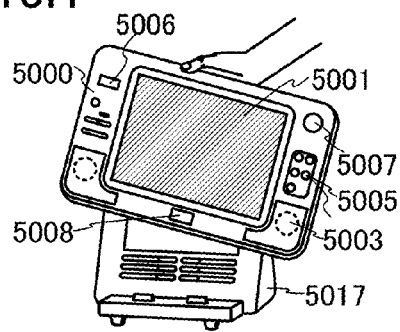
Figure 14A:
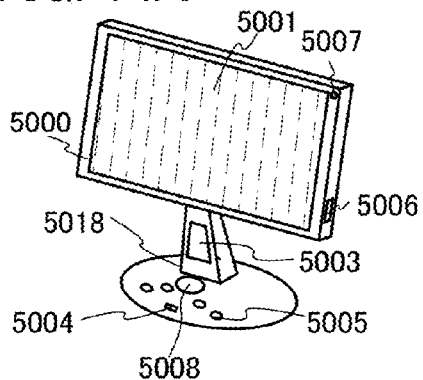
FIGS. 14A to 14H are external views of electronic devices of one embodiment.
Figure 14B:
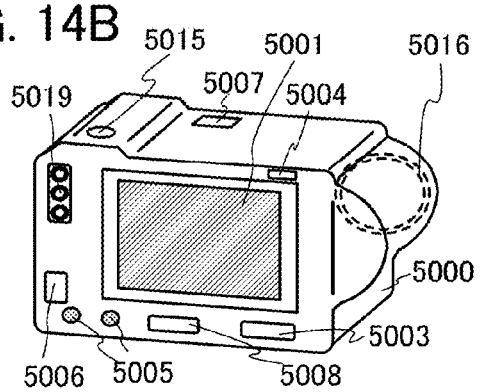
Figure 14C:
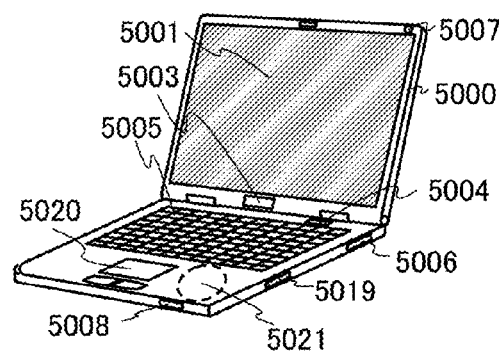
Figure 14D:
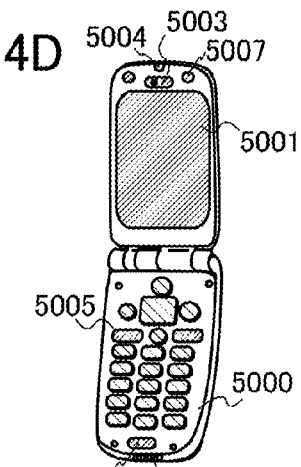

FIG. 13A illustrates a portable computer, which can include a switch 5009, an infrared port 5010, and the like in addition to the above objects. FIG. 13B illustrates a portable image reproducing device provided with a memory medium (e.g., a DVD reproducing device), which can include a second display portion 5002, a memory medium read portion 5011, and the like in addition to the above objects. FIG. 13C illustrates a goggle-type display, which can include the second display portion 5002, a support 5012, an earphone 5013, and the like in addition to the above objects. FIG. 13D illustrates a portable game machine, which can include the memory medium read portion 5011 and the like in addition to the above objects. FIG. 13E illustrates a digital camera with a television reception function, which can include an antenna 5014, a shutter button 5015, an image reception portion 5016, and the like in addition to the above objects. FIG. 13F illustrates a portable game machine, which can include the second display portion 5002, the memory medium read portion 5011, and the like in addition to the above objects. FIG. 13G illustrates a television receiver, which can include a tuner, an image processing portion, and the like in addition to the above objects. FIG. 13H illustrates a portable television receiver, which can include a charger 5017 capable of transmitting and receiving signals, and the like in addition to the above objects. FIG. 14A illustrates a display, which can include a support base 5018 and the like in addition to the above objects. FIG. 14B illustrates a camera, which can include an external connection port 5019, a shutter button 5015, an image reception portion 5016, and the like in addition to the above objects. FIG. 14C illustrates a computer, which can include a pointing device 5020, the external connection port 5019, a reader/writer 5021, and the like in addition to the above objects. FIG. 14D illustrates a mobile phone, which can include a transmitter, a receiver, a tuner of 1 seg partial reception service for mobile phones and mobile terminals, and the like in addition to the above objects.

The electronic devices illustrated in FIGS. 13A to 13H and FIGS. 14A to 14D can have a variety of functions, for example, a function of displaying a variety of data (a still image, a moving image, a text image, and the like) on the display portion, a touch panel function, a function of displaying a calendar, date, time, and the like, a function of controlling a process with a variety of software (programs), a wireless communication function, a function of being connected to a variety of computer networks with a wireless communication function, a function of transmitting and receiving a variety of data with a wireless communication function, a function of reading a program or data stored in a memory medium and displaying the program or data on the display portion, and the like. Furthermore, the electronic device including a plurality of display portions can have a function of displaying image data mainly on one display portion while displaying text data on another display portion, a function of displaying a three-dimensional image by displaying images on a plurality of display portions with a parallax taken into account, or the like. Furthermore, the electronic device including an image receiving portion can have a function of shooting a still image, a function of taking a moving image, a function of automatically or manually correcting a shot image, a function of storing a shot image in a memory medium (an external memory medium or a memory medium incorporated in the camera), a function of displaying a shot image on the display portion, or the like. Note that functions that can be provided for the electronic devices illustrated in FIGS. 13A to 13H and FIGS. 14A to 14D are not limited to those described above, and the electronic devices can have a variety of functions.

The electronic devices described in this embodiment each include the display portion for displaying some sort of data.

Next, application examples of the liquid crystal display device will be described.

Figure 14E:
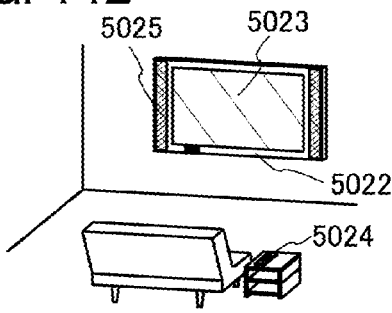

FIG. 14E illustrates an example in which a liquid crystal display device is incorporated in a building structure. FIG. 14E illustrates a housing 5022, a display portion 5023, a remote control 5024 that is an operation portion, a speaker 5025, and the like. The liquid crystal display device is incorporated in the building structure as a wall-hanging type and can be provided without requiring a large space.

Figure 14F:
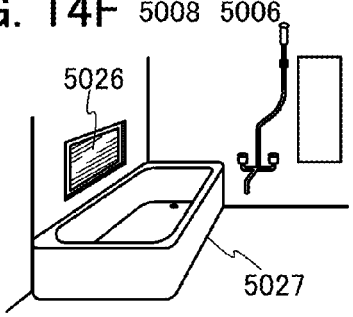

FIG. 14F illustrates another example in which a liquid crystal display device is incorporated in a building structure. A display module 5026 is incorporated in a prefabricated bath unit 5027, so that a bather can view the display module 5026.

Note that this embodiment shows, but is not limited to, the wall and the prefabricated bath unit as examples of the building structures. The liquid crystal display devices can be provided in a variety of building structures.

Next, examples in which liquid crystal display devices are incorporated in moving objects are described.

Figure 14G:
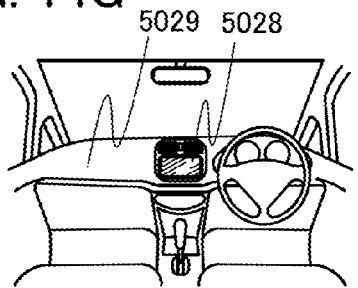

FIG. 14G shows an example in which a liquid crystal display device is incorporated in a car. A display module 5028 is incorporated in a car body 5029 of the car and can display information related to the operation of the car or information input from the inside or outside of the car on demand. Note that the display module 5028 may have a navigation function.

Figure 14H:
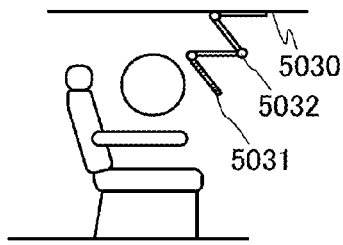

FIG. 14H shows an example in which a liquid crystal display device is incorporated in a passenger airplane. FIG. 14H illustrates a usage pattern when a display module 5031 is provided for a ceiling 5030 above a seat of the passenger airplane. The display module 5031 is incorporated in the ceiling 5030 through a hinge portion 5032, and a passenger can view the display module 5031 by stretching of the hinge portion 5032. The display module 5031 has a function of displaying information by the operation of the passenger.

Note that this embodiment shows, but is not limited to, bodies of a car and an airplane as examples of moving objects. The liquid crystal display devices can be provided for a variety of objects such as two-wheeled vehicles, four-wheeled vehicles (including cars, buses, and the like), trains (including monorails, railroads, and the like), and vessels.

Note that in this specification and the like, in a diagram or a text described in one embodiment, it is possible to take out part of the diagram or the text and constitute an embodiment of the invention. Thus, in the case where a diagram or a text related to a certain portion is described, the context taken out from part of the diagram or the text is also disclosed as one embodiment of the invention, and one embodiment of the invention can be constituted. Therefore, for example, in a diagram or a text in which one or more active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like are described, it is possible to take out part of the diagram or the text and constitute one embodiment of the invention. For example, from a circuit diagram in which N circuit elements (e.g., transistors or capacitors; N is an integer) are provided, it is possible to constitute one embodiment of the invention by taking out M circuit elements (e.g., transistors or capacitors; M is an integer, where M<N). As another example, it is possible to constitute one embodiment of the invention by taking out M layers (M is an integer, where M<N) from a cross-sectional view in which N layers (N is an integer) are provided. As another example, it is possible to constitute one embodiment of the invention by taking out M elements (M is an integer, where M<N) from a flow chart in which N elements (N is an integer) are provided.

Note that in this specification and the like, in a diagram or a text described in one embodiment, in the case where at least one specific example is described, it will be readily appreciated by those skilled in the art that a broader concept of the specific example can be derived. Thus, in the diagram or the text described in one embodiment, in the case where at least one specific example is described, a broader concept of the specific example is disclosed as one embodiment of the invention, and one embodiment of the invention can be constituted.

Note that in this specification and the like, content described in at least a diagram (or may be part of the diagram) is disclosed as one embodiment of the invention, and one embodiment of the invention can be constituted. Thus, when certain content is described in a diagram, the content is disclosed as one embodiment of the invention even when the content is not described with a text, and one embodiment of the invention can be constituted. Similarly, part of a diagram that is taken out from the diagram is disclosed as one embodiment of the invention, and one embodiment of the invention can be constituted.

This application is based on Japanese Patent Application serial No. 2013-270825 filed with Japan Patent Office on Dec. 27, 2013, the entire contents of which are hereby incorporated by reference.

What is claimed is:

1. A display device including a circuit implementing a circuit diagram comprising:
   a signal line configured to be supplied with a data voltage having a first potential and a second potential;
   a first circuit capable of holding the first potential at a first node and electrically connected to the signal line;
   a second circuit capable of holding the second potential at a second node and electrically connected to the first circuit;
   a first transistor comprising a first gate terminal, a first terminal, and a second terminal, wherein, in the circuit diagram, the first gate terminal of the first transistor is directly connected to the first node and configured to be supplied with the first potential;
   a second transistor comprising a second gate terminal, a third terminal, and a fourth terminal, wherein, in the circuit diagram, the second gate terminal of the second transistor is directly connected to the second node and configured to be supplied with the second potential;
   a display element comprising one electrode, wherein the one electrode of the display element is electrically connected to the first terminal of the first transistor and the third terminal of the second transistor;
   a first wiring configured to be supplied with a first signal and directly connected to the second terminal of the first transistor in the circuit diagram; and
   a second wiring configured to be supplied with a second signal and directly connected to the fourth terminal of the second transistor in the circuit diagram.

2. The display device according to claim 1,
   wherein the first circuit comprises:
      a third transistor comprising a third gate terminal, a fifth terminal, and a sixth terminal, and
   wherein the second circuit comprises:
      a fourth transistor comprising a fourth gate terminal and a seventh terminal; and
      a fifth transistor comprising a fifth gate terminal and an eighth terminal,
      wherein the third gate terminal of the third transistor is electrically connected to a scan signal line,
      wherein the fifth terminal is electrically connected to the signal line,
      wherein the sixth terminal is electrically connected to the first node,
      wherein the fourth gate terminal is electrically connected to the first node,
      wherein the seventh terminal is electrically connected to the second node,
      wherein the fifth gate terminal is electrically connected to a reset signal line, and
      wherein the eighth terminal is electrically connected to the second node.

3. The display device according to claim 2, wherein each of the third to fifth transistors comprises a channel formation region in an oxide semiconductor layer.

4. The display device according to claim 2,
wherein the first circuit comprises a first capacitor,
wherein one electrode of the first capacitor is electrically connected to the first node,
wherein the second circuit comprises a second capacitor, and
wherein one electrode of the second capacitor is electrically connected to the second node.

5. The display device according to claim 4, wherein the other electrode of the first capacitor and the other electrode of the second capacitor are electrically connected to a third wiring configured to be supplied with one of the first potential and the second potential.

6. The display device according to claim 1, wherein the first potential is higher than the second potential.

7. The display device according to claim 1, wherein a potential of the first signal is lower than the first potential and higher than the second potential.

8. The display device according to claim 1,
wherein the display element comprises a liquid crystal layer, and
wherein the one electrode of the display element is a reflective electrode.

9. The display device according to claim 8,
wherein the first signal allows light to pass through the liquid crystal layer, and
wherein the second signal prevents light from passing through the liquid crystal layer.

10. The display device according to claim 1, wherein the display element comprises a light-emitting layer.

11. An electronic device comprising the display device according to claim 1.

12. A liquid crystal display device including a circuit implementing a circuit diagram comprising:
a signal line configured to be supplied with a data voltage having a first potential and a second potential;
a reset signal line configured to be supplied with a reset signal;
a scan signal line configured to be supplied with a scan signal;
a first circuit comprising a first node and electrically connected to the signal line and the scan signal line;
a second circuit comprising a second node and electrically connected to the reset signal line;
a first transistor comprising a first gate terminal and a first terminal, wherein, in the circuit diagram, the first gate terminal of the first transistor is directly connected to the first node;
a second transistor comprising a second gate terminal and second terminal, wherein in the circuit diagram, the second gate terminal of the second transistor is directly connected to the second node; and
a liquid crystal element comprising one electrode, wherein the one electrode of the liquid crystal element is electrically connected to the first terminal of the first transistor and the second terminal of the second transistor,
wherein the first circuit is configured so that the second potential is held at the first node in response to supply of the scan signal to the first circuit and then one of the first potential and the second potential is held at the first node in response to supply of the data voltage to the first circuit,
wherein the second circuit is configured so that the first potential is held at the second node in response to supply of the reset signal to the second circuit and then the other of the first potential and the second potential is held at the second node in response to the supply of the data voltage to the first circuit, and
wherein the first potential is higher than the second potential.

13. The liquid crystal display device according to claim 12,
wherein the first transistor further comprises a third terminal,
wherein the third terminal of the first transistor is electrically connected to a first wiring configured to be supplied with a first signal which allows light to pass through a liquid crystal layer,
wherein the first transistor further comprises a fourth terminal,
wherein the fourth terminal of the second transistor is electrically connected to a second wiring configured to be supplied with a second signal which prevents light from passing through the liquid crystal layer, and
wherein the one electrode of the liquid crystal element is a reflective electrode.

14. The liquid crystal display device according to claim 13, wherein a potential of the first signal is lower than the first potential and higher than the second potential.

15. The liquid crystal display device according to claim 12,
wherein the first circuit comprises:
a third transistor comprising a third gate terminal, a fifth terminal, and a sixth terminal, and
wherein the second circuit comprises:
a fourth transistor comprising a fourth gate terminal and a seventh terminal; and
a fifth transistor comprising a fifth gate terminal and an eighth terminal,
wherein the third gate terminal of the third transistor is electrically connected to the scan signal line,
wherein the fifth terminal is electrically connected to the signal line,
wherein the sixth terminal is electrically connected to the first node,
wherein the fourth gate terminal is electrically connected to the first node,
wherein the seventh terminal is electrically connected to the second node,
wherein the fifth gate terminal is electrically connected to the reset signal line, and
wherein the eighth terminal is electrically connected to the second node.

16. The liquid crystal display device according to claim 15, wherein each of the third to fifth transistors comprises a channel formation region in an oxide semiconductor layer.

17. The liquid crystal display device according to claim 15,
wherein the first circuit comprises a first capacitor,
wherein one electrode of the first capacitor is electrically connected to the first node,
wherein the second circuit comprises a second capacitor, and
wherein one electrode of the second capacitor is electrically connected to the second node.

18. An electronic device comprising the liquid crystal display device according to claim 12.

* * * * *